US011238240B2

(12) United States Patent
Hunter

(10) Patent No.: US 11,238,240 B2
(45) Date of Patent: Feb. 1, 2022

(54) SEMANTIC MAP GENERATION FROM NATURAL-LANGUAGE-TEXT DOCUMENTS

(71) Applicant: Digital Asset Capital, Inc., Gaithersburg, MD (US)

(72) Inventor: Edward Hunter, Gaithersburg, MD (US)

(73) Assignee: Digital Asset Capital, Inc., Gaithersburg, MD (US)

( * ) Notice: Subject to any disclaimer, the term of this patent is extended or adjusted under 35 U.S.C. 154(b) by 0 days.

(21) Appl. No.: 17/337,239

(22) Filed: Jun. 2, 2021

(65) Prior Publication Data

US 2021/0383070 A1 Dec. 9, 2021

Related U.S. Application Data

(60) Provisional application No. 63/034,255, filed on Jun. 3, 2020, provisional application No. 63/134,872, filed on Jan. 7, 2021, provisional application No. 63/191,724, filed on May 21, 2021.

(51) Int. Cl.

| | |
|---|---|
| *G06F 17/00* | (2019.01) |
| *G06F 40/30* | (2020.01) |
| *G06F 40/284* | (2020.01) |
| *G06N 20/00* | (2019.01) |
| *G06F 40/103* | (2020.01) |

(52) U.S. Cl.
CPC ............ *G06F 40/30* (2020.01); *G06F 40/103* (2020.01); *G06F 40/284* (2020.01); *G06N 20/00* (2019.01)

(58) Field of Classification Search
None
See application file for complete search history.

(56) References Cited

U.S. PATENT DOCUMENTS

| | | | |
|---|---|---|---|
| 10,496,752 B1 * | 12/2019 | Crossley | ............... G06F 40/30 |
| 10,509,863 B1 * | 12/2019 | Arfa | .................... G06K 9/6232 |
| 10,558,759 B1 * | 2/2020 | Arfa | ........................ G06N 3/08 |
| 2010/0312545 A1 | 12/2010 | Sites | |
| 2012/0253793 A1 | 10/2012 | Ghannam et al. | |

(Continued)

FOREIGN PATENT DOCUMENTS

KR    10-2009-0130854 A    12/2009

OTHER PUBLICATIONS

International Search Report and Written Opinion in related international application PCT/US2021/035516.

*Primary Examiner* — Satwant K Singh
(74) *Attorney, Agent, or Firm* — Pillsbury Winthrop Shaw Pittman, LLP

(57) ABSTRACT

A computer-implemented process includes obtaining a natural-language-text document comprising a first and second clause and determining first and second embedding sequences based on n-grams of the first and second clauses. The process includes generating data model objects based on the embedding sequences and determining an association between the first data model object and the second data model object based on a shared parameter of the first and second clauses. The process includes receiving a query including the first category and the first n-gram and causing a presentation of a visualization of data model objects that includes shapes based on the data model objects and a third shape based on the association between the first data model object and the second data model object.

38 Claims, 7 Drawing Sheets

(56) References Cited

U.S. PATENT DOCUMENTS

| | | |
|---|---|---|
| 2012/0303358 A1 | 11/2012 | Ducatel et al. |
| 2017/0270100 A1 | 9/2017 | Audhkhasi et al. |
| 2018/0232648 A1 | 8/2018 | Acharya |
| 2019/0188285 A1* | 6/2019 | Scheau ............... G06F 16/9038 |
| 2020/0019613 A1 | 1/2020 | Bacarella et al. |
| 2020/0089769 A1* | 3/2020 | Crossley ............... G06F 40/295 |
| 2020/0184376 A1 | 6/2020 | Parameswaran et al. |
| 2020/0201910 A1 | 6/2020 | Gavaudan et al. |
| 2020/0293324 A1 | 9/2020 | Cella |
| 2020/0302523 A1 | 9/2020 | Cella |
| 2020/0302525 A1 | 9/2020 | Cella |
| 2020/0334369 A1 | 10/2020 | Koch et al. |
| 2021/0049700 A1* | 2/2021 | Nguyen ................ G06N 7/005 |

* cited by examiner

SEMANTIC MAP GENERATION FROM NATURAL-LANGUAGE-TEXT DOCUMENTS

CROSS-REFERENCE TO RELATED APPLICATIONS

This patent claims the benefit of U.S. Provisional Patent Application 63/034,255, filed on Jun. 3, 2020 titled "SEMANTIC CONTRACT MAPS." This patent also claims the benefit of U.S. Provisional Patent Application 63/134, 872, filed on Jan. 7, 2021, titled "STRUCTURED SEMANTIC CONTRACT MAPS." This patent also claims the benefit of U.S. Provisional Patent Application 63/191,724 filed on May 21, 2021, titled "SEMANTIC CONTRACT MAPPING WITH DEEP LEARNING." The entire content of each afore-listed patent filing is hereby incorporated by reference for all purposes.

BACKGROUND

Distributed applications operating on a distributed computing platform may be useful in a variety of contexts. Such applications can store program state data on a tamper-evident data store operating on the distributed computing platform. The use of a tamper-evident data store or some other data systems distributed over multiple computing devices may increase the security and reliability of distributed applications. Additionally, data queried from the tamper-evident data store may be utilized in applications related to the context in which the tamper-evident data store is used.

SUMMARY

The following is a non-exhaustive listing of some aspects of the present techniques. These and other aspects are described in the following disclosure.

Some aspects include a process that includes obtaining a natural-language-text document comprising a first clause and a second clause. The process includes determining a first embedding sequence based on n-grams of the first clause and a second embedding sequence based on n-grams of the second clause. The process includes generating a first data model object and a second data model object based on the first embedding sequence and the second embedding sequence. The first data model object comprises a first field populated with a first n-gram of the first clause and a second field populated with a first category. The second data model object comprises third field populated with a second n-gram of the second clause and a fourth field populated with a second category. The process includes determining an association between the first data model object and the second data model object based on a shared parameter of the first and second clauses. The process includes receiving a query comprising the first category and the first n-gram. The process includes causing a presentation of a visualization of the first and second data model objects in response to receiving the query. The visualization includes a first shape comprising the first n-gram and the first category, a second shape comprising the second n-gram and the second category, and a third shape comprising a first end that is connected to the first shape and a second end that is connected to the second shape based on the association between the first data model object and the second data model object. The process includes storing the first data model object and the second data model object to memory.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
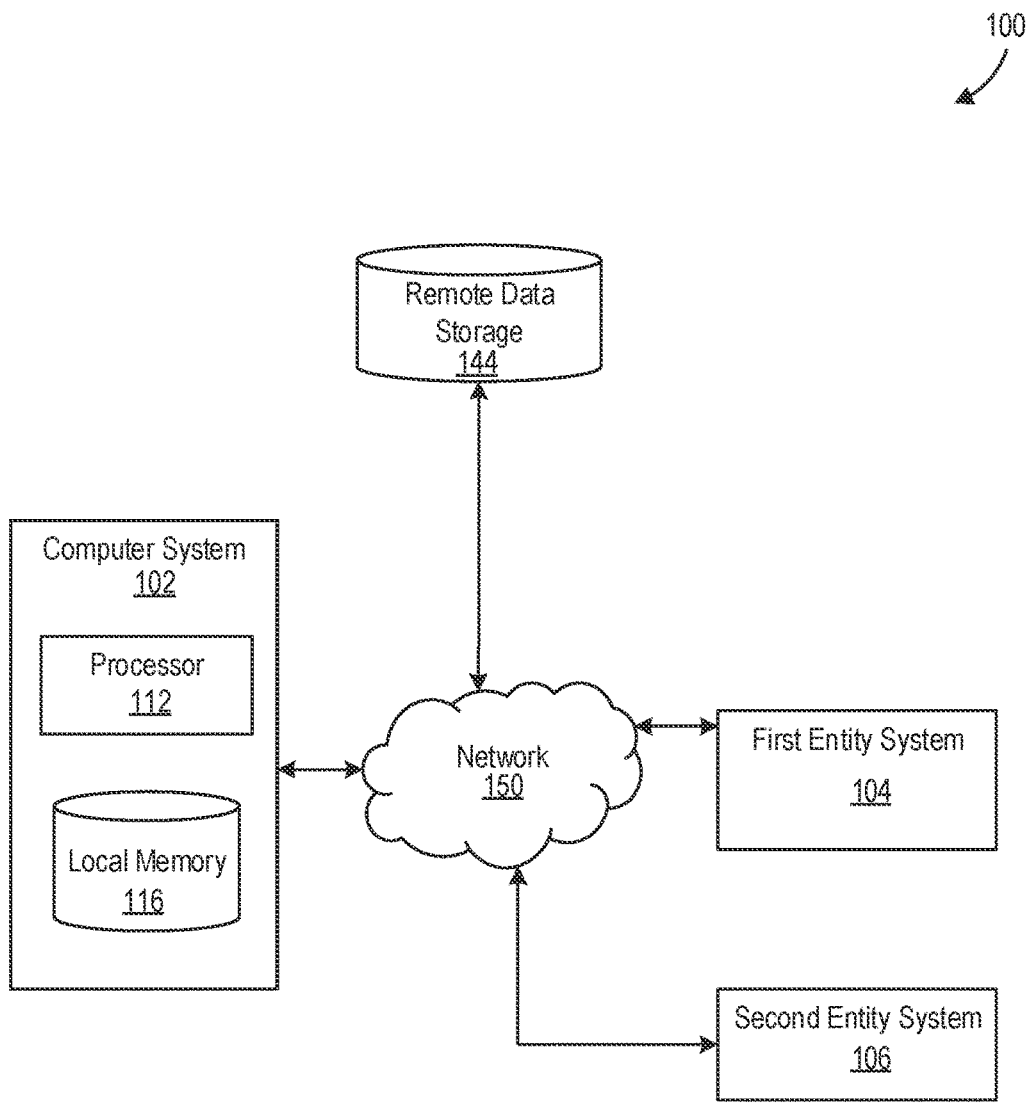
FIG. 1 is a schematic diagram of a first computing environment in which a self-executing protocol may be generated from a natural-language-text document, in accordance with some embodiments of the present techniques.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of natural language processing. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Technology-based self-executing protocols, such as smart contracts and other programs, have seen increased use in recent years. However, some smart contracts data models and other data models used by self-executing protocols often rely on industry-specific conventions that may be difficult to generalize, use for comparison analysis, or re-use in similar contexts due to minor differences in contract details. As a result, the use of self-executing protocols has not extended into areas that are often the domain of natural-language-text documents. In contrast, contracts encoded in a natural-language-text document often rely on imprecise human interpretation systems to provide the resources and mechanisms to construct, interpret, and enforce terms in the natural-language-text document. As contract terms increase in number or a situation within which a contract was formed evolves, such reliance may lead to a lack of enforcement, ambiguity, and wasted resources spent on the re-interpretation or enforcement of contract terms. Described herein is a process and related system to construct a semantic map that permits the interpretation, analysis, and reliable re-use of terms for a self-executing protocol in a systematic and unambiguous way across a broad range of applicable fields.

The interpretability of a complex natural-language-text document may be significantly enhanced by generating appropriate data structures that satisfy the boundaries and expectations of a domain of the natural-language-text document. Some embodiments may use one or more operations described in this disclosure to generate a semantic map based on the text of a natural-language-text document. A semantic map may include a data structure comprising data model objects (i.e., "data entity") such as semantic triples or semantic doubles, where the data model objects may be nested with respect to each other or may be otherwise associated with each other. As used in this disclosure, a semantic triple may include a data model object including at least three values that codifies a statement about semantic data, where each of the three values may be associated with a different parameter identifier. While some embodiments of a semantic triple may codify a semantic statement such that a first field value stores a subject identifier, a second field value stores a predicate identifier, and a third field value stores an object identifier, other versions of a semantic triple are possible. Reference to "objects" should not be read as limiting the present techniques to object-oriented programming languages. The term, rather, references a data structure that may be implemented in object-oriented and non-object-oriented programming languages. Semantic triples may be part of larger unit data structures with more than three fields without ceasing to constitute a "semantic triple," e.g., a semantic triple embedded in a unit data structure with four fields is still a semantic triple.

Some embodiments may associate category values with the data model objects or use the data model objects as elements of conditional statements or portions of conditional statements. In some embodiments, some of the category values may represent categories of deontic logic or otherwise be mutually exclusive with respect to each other, where the properties of mutual exclusivity may be used to increase machine efficiency when processing or searching through data model objects and predicting possible outcomes. For example, some embodiments may use a semantic map stored in the form of a directed graph to predict outcomes using one or more operations described in U.S. Pat. No. 10,990,879, titled "GRAPH EXPANSION AND OUTCOME DETERMINATION FOR GRAPH-DEFINED PROGRAM STATES," which is hereby incorporated by reference in its entirety.

In some embodiments, a clause or other text section of a natural-language-text document may be associated with a category value based on a conditional statement generated from the clause, where the conditional statement may be generated from one or more data model objects that were determined from the clause. For example, some embodiments may associate a first semantic triple with the category value "right," where the category value may indicate that the semantic triple represents a right of a first entity to perform one or more operations indicated by the semantic triple. Some embodiments may indicate different types of category values with different entities. For example, the category value "right" for a first semantic triple may be associated with a first entity and not associated with a second entity in response to a determination that the semantic triple is a right of the first entity and not a right of the second entity. Furthermore, some embodiments may distinguish between different types of data model objects based on their content, where a semantic triple may include non-processed text, a proposition data structure, or another data model object, such as a semantic triple described in provisional patent application 63/034,255, filed on Jun. 3, 2020 and titled "SEMANTIC CONTRACT MAPS," which is hereby incorporated by reference in its entirety. For example, some embodiments may generate a semantic triple in the form of an "(s, p, t)" semantic triple. As described elsewhere in this disclosure, in an "(s, p, t)" semantic triple, "s" may represent an entity associated with a category value and "p" may represent the category value selected from a set of mutually exclusive categories "["right", "obligation", "prohibition"]. Furthermore, "t" may represent an object entity, text including both a verb predicate and an object, a semantic double or second data model object that may include the verb predicate in a first field of the second data model object and the object entity in a second field of the second data model object, or the like.

In some embodiments, the category value of a semantic triple or another data model object may represent a category of a deontic logic model, where category values may be selected from a set of deontic primitive categories. As recited elsewhere in this disclosure, a category value may include a label such as "right," "obligation," or "prohibition." The category value may indicate whether a written or program-encoded behavior is one that an entity may perform, must perform to avoid a consequent outcome, or must not perform to not trigger a consequent outcome. As recited elsewhere in this disclosure, a semantic triple or other data model object may be associated with a status such as "true," "false," or "unrealized," where the status may be associated with a conditional statement that indicates one or more consequent outcomes based on the status or a change in status. The set of data model objects generated from a natural-language-text document may be collected into a directed graph, where the directed graph may be stored in various formats such as a graph database, a set of links associating records of a SQL database, or the like. The directed graph may include information associated with the set of data model objects, such as associative array of data model objects, their associated category values, their associated states, text obtained from clauses or other text sections used to generate a data model object, labels of headers or other identifiers for the text sections, timestamps indicating times when a data model object is updated, entity identifiers, or the like.

As discussed elsewhere in this disclosure, some embodiments may use one or more machine learning models to determine data model objects from natural language text, determine inferences based on the data model objects, or perform other information extraction or categorization operations. For example, some embodiments may apply natural language processing (NLP) operations to convert an existing prose document into a semantic map of a smart contract using operations similar to those described for patent application 63/134,872, filed on Jan. 7, 2021, titled "STRUCTURED SEMANTIC CONTRACT MAPS," which is hereby incorporated by reference in its entirety. For example, some embodiments may determine that a natural-language-text document includes a first clause that recites, "subject to the terms and conditions set forth herein, each lender severally agrees to make a term A loan in dollars to the parent borrower on the closing date in an aggregate principal amount not exceeding its term A commitment." Using one or more operations described in this disclosure, some embodiments may use a machine learning model or another natural language model to generate a semantic triple "(lender, obligation, to make a term A loan)." Some embodiments may further extract "to make" from the recited text after a determination that "to make" is a verb predicate and convert the proposition "to make a term A loan" into the predicate object pair "(to make, term A loan)." As described elsewhere in this disclosure, some embodiments may use one or more implementations of NLP methods to extract information from the text of clauses. Alternatively, or in addition, some embodiments may extract additional information from the natural language text or further segment the extracted information into additional data model objects and associate the additional information with the semantic triple.

As described elsewhere in this disclosure, some embodiments may store data model objects or other information extracted from a natural-language-text document into a directed graph, where a graph may be referred to as the same graph after the graph is manipulated. For example, if a graph is referred to as a "first graph" is modified to include an extra graph vertex and graph edge, the term "first graph" may be used to refer to the modified graph. Additionally, it should be understood that a data structure need not be labeled in program code as a graph to constitute a graph, as long as that data structure encodes the relationships between values described herein. For example, a graph may be encoded in a key-value store even if the source code does not label the key-value store as a graph. In some embodiments, graph vertices of a directed graph may represent text sections such as paragraphs, clauses, contract agreement terms or the like. Alternatively, or in addition, some embodiments may generate the graph vertices that are associated with data model objects generated from the clauses or other text sections. Additionally, graph edges may represent parent-child relationships or references between the text sections, where the graph edges may be associated with labels indicating different relationships between text sections or data model objects generated from the text sections. Some embodiments may use the directed graph as a semantic map that permits efficient navigation and visualization of information stored in a natural-language-text document.

Some embodiments may use a semantic map to generate a self-executing protocol. As used in this disclosure, a self-executing protocol may include a program executable as a script, an application, or portion of an application on a decentralized distributed computing platform, centralized computing system, or single computing device. Self-executing protocols may execute responsive to external events, which may include outputs of third-party programs, measurements provided by sensors, or human input via a user interface (UI). For example, a self-executing protocol may execute on a computing substrate that involves human intervention to operate, like turning on a computer and launching an event listener.

A self-executing protocol may be implemented in various ways. For example, some embodiments may construct, enforce, or terminate the self-executing protocol using a distributed ledger or distributed computing system. Alternatively, some embodiments may implement the self-executing protocol using a request-response system over a public or private internet protocol (IP) network. Using the methods described in this disclosure may increase the efficiency of self-executing protocol enforcement by advancing the state of complex computer programs that enforce behaviors between multiple independent entities in a fast and unambiguous way. Furthermore, implementing and using self-executing protocols with the embodiments described herein may allow for the comparison, quantification, and reuse of self-executing protocols in a way that would be inapplicable to custom-coded self-executing protocols. In some embodiments, the self-executing protocol may be stored in a distributed, tamper-evident data store. A distributed, tamper-evident data store (e.g., repositories rendering data tamper-evident with one or more tamper-evident data structures) afford desirable properties, including making it relatively easy to detect tampering with entries in the data store and making it relatively difficult to modify entries to avoid such detection. Furthermore, various self-executing protocols may be operating across one or more nodes of a computer network hosting the distributed, tamper-evident data store, reducing the susceptibility of the self-executing protocol to geographically localized attacks or anomalies.

In some embodiments, graph vertices of a directed graph generated from a natural-language-text document may be associated with (e.g., encode, identify, or otherwise represent) data model objects, such as a normative statement ("norm") of a self-executing protocol. In some embodiments, the data model object may represent a formal language statement that, as described elsewhere in this disclosure, may be paired with a set of statuses, such as a truth condition. For example, the data model object may be used as a part of a conditional statement that branches program flow or otherwise changes program state responsive to a determination that a truth condition is satisfied. For example, a graph vertex of a directed graph may include a conditional statement that includes a first semantic triple associated with a truth condition. The graph vertex may also include a second semantic triple associated with a consequent outcome that occurs in response to a determination that the truth condition is set to a status indicating satisfaction of the first conditional statement. Furthermore, it should be understood that the term "norm" is used for illustrative purposes and that this term may have different names in other references and contexts.

As described elsewhere in this disclosure, text sections may be associated with a collection of one or more data model objects representing a norm, where the collection of data model objects may include conditions, outcomes of condition satisfaction or failure, indications of a satisfaction status, or the like. In some embodiments, satisfying a condition of a conditional statement may change a satisfaction status of the conditional statement and lead to the creation or activation of a consequent norm of the conditional statement based on the actions performed by the system when executing the outcome subroutines corresponding to the satisfied condition. In some embodiments, an active conditional statement may be triggered when a determination is made that an event satisfies a condition of the conditional statement, where triggering an active conditional statement may cause a consequent outcome of the active conditional statement to occur. For example, some embodiments may trigger a conditional statement after determining that an event indicates that an action stored in a semantic triple has been performed, where the semantic triple is used as an associated condition of the conditional statement. Alternatively, some types of conditional statements may be triggered when an associated condition of the conditional statement is not satisfied before a condition expiration threshold is satisfied.

As used in this disclosure, an active conditional statement is a conditional statement having associated conditions that, after having been satisfied by an event, cause the occurrence of one or more consequent outcomes of the active conditional statement. In contrast, an inactive conditional statement is not updated even if its corresponding conditions are satisfied. For example, a conditional statement may include a first condition "if generator1.power_output<threshold" that is generated from the semantic triple ("generator1", "obligation", "to provide power power_output greater than threshold") using one or more operations described in patent application 63/191,724 filed on May 21, 2021, titled "SEMANTIC CONTRACT MAPPING WITH DEEP LEARNING," which is hereby incorporated by reference in its entirety. If the conditional statement is indicated as an active conditional statement, a determination that the criterion "generator1.power_output<threshold" may trigger an encoded consequent outcome, where the consequent outcome may also be generated from a semantic triple. In contrast, if the conditional statement is indicated as an inactive conditional statement, the encoded consequent outcome may remain untriggered even if a determination is made that the criterion "generator1.power_output<threshold" is not satisfied. In some embodiments, a conditional statement may remain in an inactive state because a parent conditional statement of the inactive conditional statement is not satisfied or may be rendered inactive due to other changes in the state of a self-executing protocol.

Some embodiments may store self-executing protocol data in one or more types of formats. For example, while some embodiments may temporarily store a directed graph in non-persistent storage, some embodiments may store the directed graph on a persistent storage. In some embodiments, various other types of information such as conditional statement statuses (e.g., "triggered," "failed," "satisfied," etc.), deontic categories (e.g., "rights," "obligation," "prohibition," etc.), or other information may be included in or otherwise associated with some or all of the vertices of the directed graph. Furthermore, some embodiments may generate visual display representing of the program state data to show the directed graph and its associated statuses, categories, or other information. For example, as further described below, some embodiments may display the directed graph as a set of UI elements structured as a hierarchy tree in a web application.

A self-executing protocol may be generated from a set of data model objects that incorporate elements of a deontic logic model, where an event may trigger an active conditional statement of the self-executing protocol by satisfying a condition of the conditional statement. A conditional statement of a self-executing protocol may include values stored in the set of data model objects. For example, a condition of a conditional statement may be generated based on a semantic triple that indicates that a first entity has an obligation to perform an action associated with the natural language text header "header1." Some embodiments may then generate a condition based on the action associated with the "header1" in response to a determination that the semantic triple includes a field value that indicates that the action is an obligation. Some embodiments may also perform operations to determine future outcome states of a self-executing protocol, such as a possible future change in one or more state values. Some embodiments may perform operations to determine a future outcome state using operations described in U.S. patent application Ser. No. 16/893,299, filed Jun. 4, 2020, titled "GRAPH EXPANSION AND OUTCOME DETERMINATION FOR GRAPH-DEFINED PROGRAM STATES," which is hereby incorporated by reference in its entirety.

None of the preceding should be taken to suggest that any technique is disclaimed or that the approaches described herein may not be used in conjunction with other approaches having these or other described disadvantages, for instance, some embodiments may use a custom-written smart-contract that includes one or more of the norms, data structures, or graphs described herein. Alternatively, or in addition, some embodiments may be implemented on a centralized server without storing self-executing protocol state data on a distributed computing system, such as a decentralized computing system. Further, it should be emphasized that the data structures, concepts, and instructions described herein may bear labels different from those applied here in program code, e.g., a data structure need not be labeled as a "node" or a "graph" in program code to qualify as such, provided that the essential characteristics of such items are embodied.

FIG. 1 is a schematic diagram of a first computing environment in which a self-executing protocol may be generated from a natural-language-text document, in accordance with some embodiments of the present techniques. As shown in FIG. 1, a computing environment 100 may include a computer system 102, a first entity system 104, a second entity system 106, or other computer systems. The computer system 102 may include a processor 112, a local memory 116, or other computer components. Each of the first entity system 104 or second entity system 106 may include any type of mobile computing device, fixed computing device, or other electronic device. In some embodiments, the first entity system 104 may perform transactions with the second entity system 106 by sending messages via the network 150 to the computer system 102. Parameters, variables, or other values used to perform one or more operations described in this disclosure may be retrieved or stored in the local memory 116. Alternatively, or in addition, parameters, variables, or other values used or provided by the computer system 102, entity systems 104-106, or other systems may be sent to or retrieved from the remote data storage 144 via the network 150, where the remote data storage 144 may include the memory of a distributed computing system.

In some embodiments, the computer system 102 may execute a set of applications with a processor 112 to perform one or more operations described in this disclosure, such as operations of the process 300. As described elsewhere in this disclosure, the computer system 102 may obtain a natural-language-text document and segment the natural-language-text document into text sections. The computer system 102 may then determine a set of learned representations (e.g., embedding vectors, categories, etc.) corresponding to the words, lexical items, or other n-grams of the text sections. For example, the computer system 102 may use a set of neural network layers or other components of a trained machine learning model to generate embedding vectors based on the natural language text. In some embodiments, the computer system 102 may include or be part of a decentralized computing platform capable of persisting state to a decentralized tamper-evident data store. Furthermore, in some embodiments, the decentralized computing platform may be capable of executing various programs, such as smart contracts, on the computing platform in a decentralized, verifiable manner. For example, the computing platform may be hosted on a peer-to-peer data-sharing network, where each peer node of a set of peer nodes of the peer-to-peer data-sharing network may perform the same computations. In some embodiments, a consensus may be reached regarding results of the computation. In some embodiments, various consensus algorithms (e.g., Raft, Paxos, Helix, Hotstuff, Practical Byzantine Fault Tolerance, Honey Badger Byzantine Fault Tolerance, or the like) may be implemented to determine states or computation results of the various programs executed on the decentralized computing platform without requiring that any one computing device be a trusted device (e.g., require an assumption that the computing device's computation results are correct). The one or more consensus algorithms used may be selected or altered to impede an entity from modifying, corrupting, or otherwise altering results of the computation by peer nodes of the peer-to-peer data sharing network not under the entity's control. Examples of a decentralized tamper-evident data store may include Interplanetary File System, Blockstack, Swarm, or the like. Examples of a decentralized computing platform may include Hyperledger (e.g., Sawtooth, Fabric, or Iroha, or the like), Stellar, Ethereum, EOS, Bitcoin, Corda, Libra, NEO, or Openchain.

The computer system 102 may generate a set of data model objects corresponding to propositions detected with a natural language model based on a set of embedding vectors or text used to generate the set of embedding vectors. A data model object includes a category value that may be selected from a set of categories of a deontic logic model. Some embodiments may use a recurrent learning model or an attention-based machine learning model to categorize the deontic logic model. In some embodiments, the use of a neural network may be combined with the use of a symbolic artificial intelligence (AI) system to increase categorization accuracy or perform downstream analysis operations. In addition, the computer system 102 may determine associations between the data model objects based on shared parameters between the data model objects or shared parameters between text sections used to generate the data model objects. Furthermore, the computer system 102 may determine whether one or more of the entities identified in a data model object corresponds with an entity associated with a computer system. For example, some embodiments may associate an identifier of the first entity with the first entity system 104 such that updates to a data model object storing the first entity identifier causes a notification message to be sent to the first entity system 104. In some embodiments, the notification may be sent using operations described in U.S. patent application Ser. No. 17/015,069, filed Sep. 7, 2020, titled "GRAPH-BASED PROGRAM STATE NOTIFICATION," which is hereby incorporated by reference in its entirety.

The computer system 102 may then store a semantic map, such as a semantic map stored in the form of a graph database, in local memory 116, where the semantic map may include the category values and the association between the data model objects. Alternatively, or in addition, some embodiments may store the semantic map in a remote data storage 144, where the remote data storage 144 may include a decentralized tamper-evident data store. Furthermore, the computer system 102 may then cause the presentation of visualizations of the data model objects by sending values or program instructions to the first entity system 104 or the second entity system 106, where the visualization may include shapes that represent the data model objects or associations between the data model objects.

Figure 2:
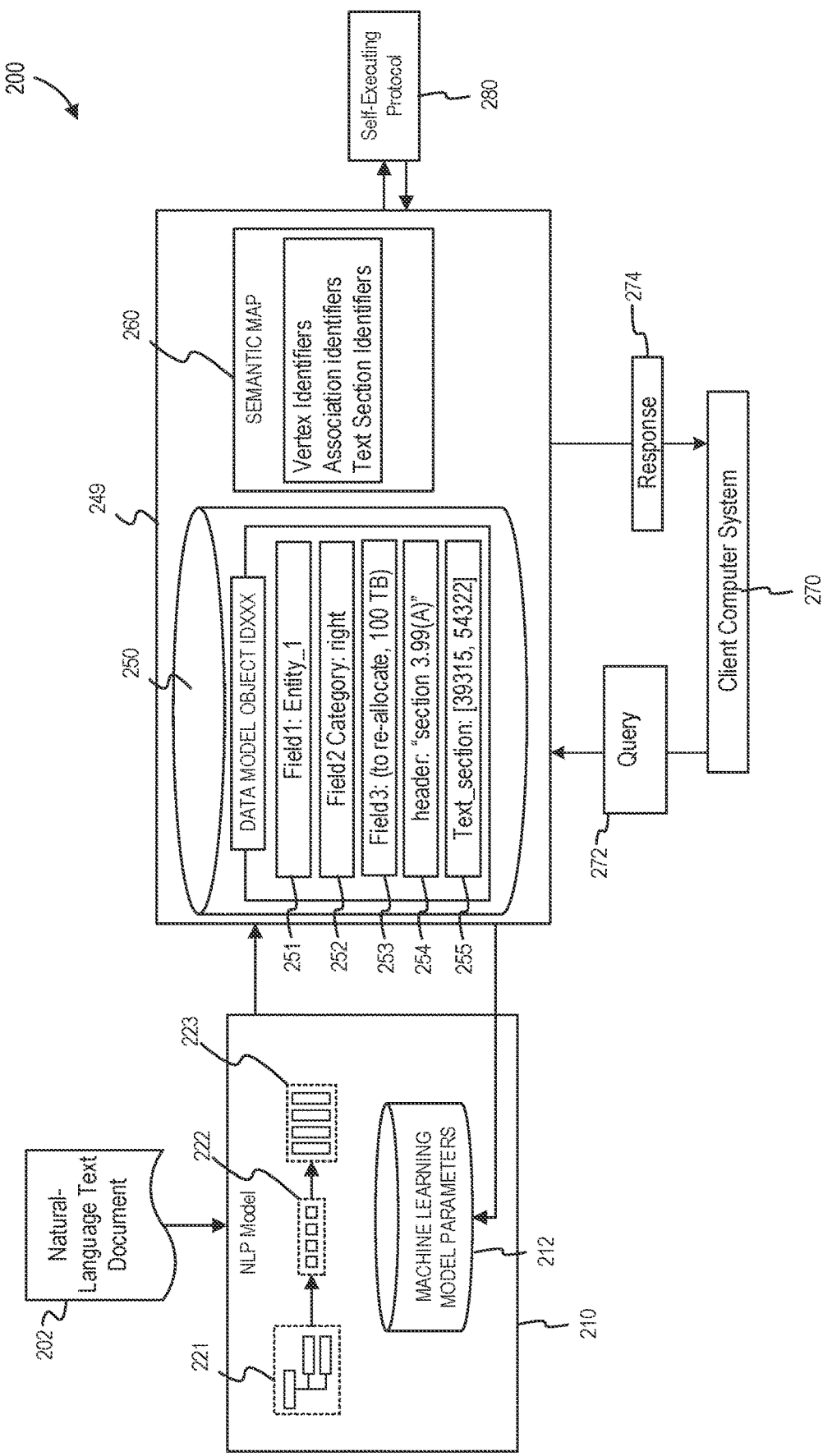
FIG. 2 depicts an example system is a logical architecture block diagram illustrating a computing environment in which a natural-language-text document may be used to generate a semantic map, in accordance with some embodiments of the present techniques.

FIG. 2 depicts an example system is a logical architecture block diagram illustrating a computing environment in which a natural-language-text document may be used to generate a semantic map, in accordance with some embodiments of the present techniques. The diagram 200 presents an NLP model 210, where the NLP model 210 may be a machine learning model that uses the machine learning model parameters 212. The natural language text document 202 may be process by the NLP model 210 to populate records, values, or other data of a data model 249 after using a finite state matching algorithm to generate structured document 221 based on the natural language text document 202. The NLP model 210 may, for each respective text section 222 of the text sections of the structured document 221, generate a respective sequence of embedding vectors 223 using the machine learning model parameters 212. Some embodiments may then perform one or more operations to determine values of the data model 249 based on the respective sequence of embedding vectors 223.

The data model 249 includes a set of data model objects 250, where records of the set of data model objects 250 may include a first field 251, a second field 252, and a third field 253. Some embodiments may populate the fields of a record of the set of data model objects 250 with entity identifiers, category values indicating a deontic model, text from a text section such as a clause used to generate the data model object, or the like. In some embodiments, a record of the data model object may include fields for additional values, such as a fourth field 254 indicating a text section title or a fifth field 255 that may be populated with a text section boundary identifier, such as a set of text positions indicating the boundaries of the text section. A data model object of the set of data model objects 250 may include various other fields, indications of an event, indications of other data model objects representing text sections that are associated with the current data model object, relationships between the data model objects, or the like. Furthermore, a field may be said to be "populated" with an n-gram in a variety of ways, including reciting that n-gram in the field, having a pointer to the n-gram in the field, and specifying a semantic referent of the n-gram in the field (e.g., a global unique identifier, a canonical identifier, or a vector in an embedding space representing the referent). An "n-gram" may be "received" with a similarly broad set of approaches, e.g., the tokens constituting the n-gram need not be received for that n-gram to be "received" if some other value specifying the referent of the n-gram is received.

In some embodiments, the data model 249 may include a semantic map 260 that may be stored in the form of a directed graph. The semantic map 260 may include graph vertex identifiers, graph edge identifiers representing associations between different data model objects, text section identifiers that identify one or more text sections associated with graph vertices of the semantic map 260, or the like. In some embodiments, a graph vertex of the semantic map 260 may be mapped to a specific data model object. For example, a graph vertex of the semantic map 260 may be mapped to a semantic triple recorded in the set of data model objects 250. Alternatively, or in addition, in some embodiments, the semantic map 260 may include graph vertices that obtain data from multiple data model objects recorded in the set of data model objects 250. For example, a graph vertex of the semantic map 260 may include data from a first semantic triple and data from a second semantic triple, where the data from the first semantic triple indicates a condition of a conditional statement of the graph vertex, and where the data from the second semantic triple indicates an outcome of the conditional statement. Some embodiments may then generate a self-executing protocol 280 based on the semantic map 260. The self-executing protocol 280 may use sensor measurements, messages sent from other computer systems, or interface-entered values to perform one or more actions based on a determination that one or more corresponding conditional statements of the self-executing protocol 280 have been triggered.

In some embodiments, a client computer system 270 may send a query 272 to the data model 249, where the query 272 may include category values, entity identifiers, or other values usable to perform a search. In response, some embodiments may search through the set of data model objects 250, traverse a graph database of the semantic map 260, or search through other data of the data model 249. Some embodiments may present a search result of the query 272 in a response 274, where the response 274 may be presented in the form of a visualization, search summary, text section excerpts, or the like. Various other querying operations may be performed, such as operations described in U.S. patent application Ser. No. 17/015,028, filed Sep. 7, 2020, titled "QUERYING GRAPH-BASED MODELS," which is hereby incorporated by reference in its entirety.

Example Flowchart

In some embodiments, the processes and functionality described herein may be implemented as computer code stored on a tangible, non-transitory, machine-readable medium, such that when instructions of the code are executed by one or more processors, the described functionality may be effectuated. For example, the process 300 of FIG. 3 may be implemented as computer code stored on a non-transitory machine-readable medium. Instructions may be distributed on multiple physical instances of memory, e.g., in different computing devices, or in a single device or a single physical instance of memory (e.g., non-persistent memory or persistent storage), all consistent with use of the singular term "medium." In some embodiments, the operations may be executed in a different order from that described, some operations may be executed multiple times per instance of the process's execution, some operations may be omitted, additional operations may be added, some operations may be executed concurrently, and other operations may be executed serially, none of which is to suggest that any other feature described herein is not also amenable to variation.

Figure 3:
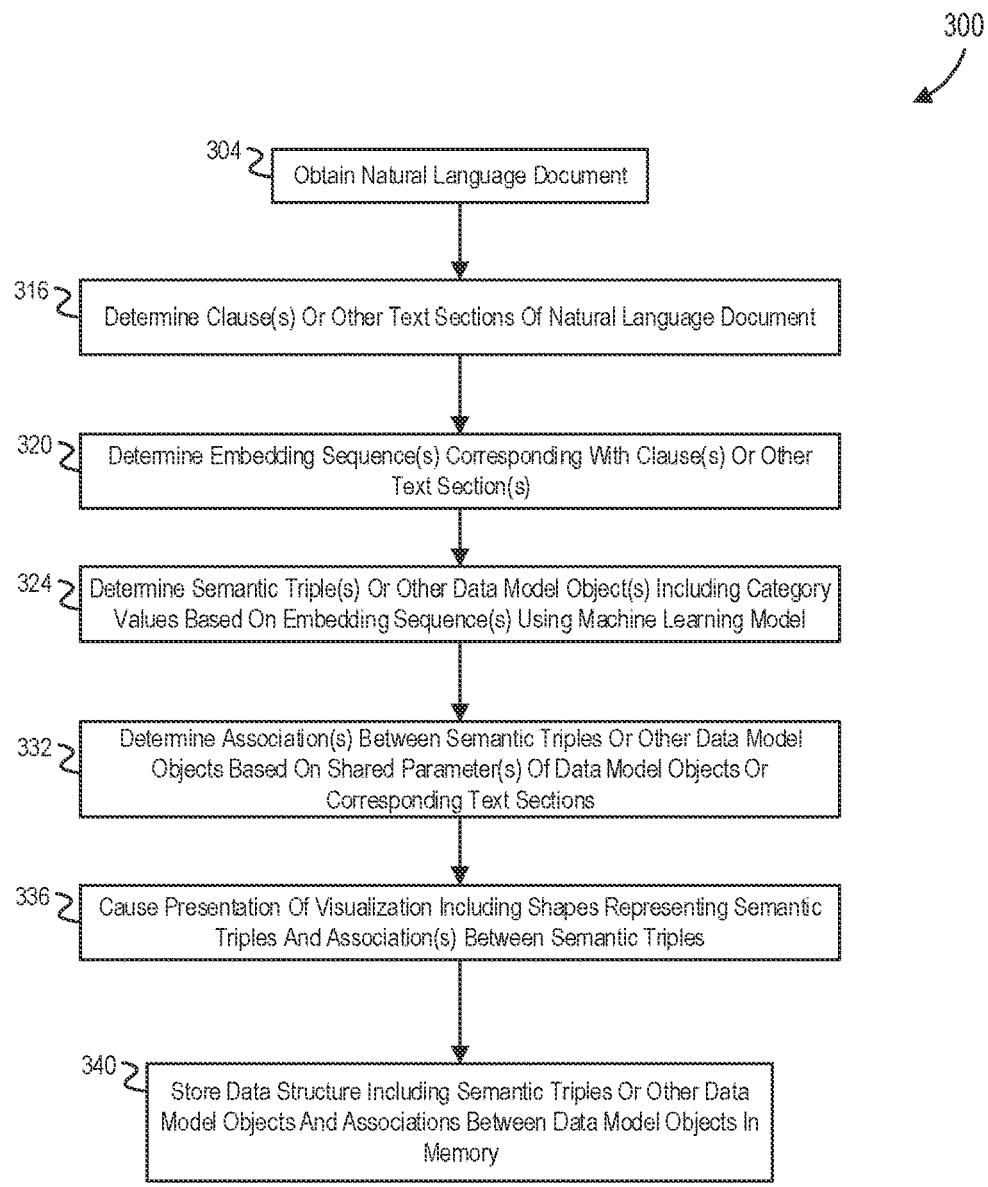
FIG. 3 is flowchart illustrating a process to generate a semantic map, in accordance with some embodiments of the present techniques.

FIG. 3 is flowchart illustrating a process to generate a semantic map, in accordance with some embodiments of the present techniques. Operations of the process 300 may begin at block 304. In some embodiments, operations of the process 300 may include obtaining a natural-language-text document, as indicated for block 304. The text of the natural-language-text document may be obtained from one of various types of sources, where the text of the document may be provided in various file types or formats such as plain text, formatted text, hypertext, or the like. The text may be separated into n-grams, where an n-gram may include a sequence of n items from text, where "n" may represent an integer and the items may include letters, syllables, phonemes, other parts of words, complete words, symbols, multi-word lexical items, or the like. For example, an n-gram may be a word, a lexical item, a sequence of lexical items, or the like. Additionally, the n-grams of a document do not need to include the same number of items with respect to each other. For example, a first n-gram of a document may be a lexical item consisting of the word "eat" and a second n-gram of the document may be a lexical item consisting of the phrase "traffic light."

The natural-language-text document may be obtained from one of a variety of data sources, such as the Internet, a private network, an internal database of an organization or another data repository, data provided directly from a UI element, or the like. For example, the natural-language-text document may be obtained from a hyperlink, a distributed database, a cloud database, a database of a private network hosted by an on-site server, a document stored in a local memory device, or the like. In many cases, the text of a natural-language-text document may include unstructured information, where information may be loosely organized or otherwise missing discrete separators usable as delimiters between different text sections. Alternatively, or in addition, the natural-language-text document may include structured data, where the structured data includes a set of headers, other types of section titles, enumerated lists, or other elements usable as delimiters to indicate different sections of the document.

In some embodiments, operations of the process 300 may include determining a set of clauses or other text sections of the natural-language-text document, as indicated for block 316. As used in this disclosure, a text section may be determined by determining the boundaries of the text section in the natural-language-text document, where the boundaries may be stored as numeric values indicating text positions. Some embodiments may assign an identifier to a text section, where the identifier may be the same as or different from one or both of the boundaries. For example, some embodiments may assign a text header to a text section as a text section identifier. Furthermore, some embodiments may assign one or more category values to the text section, as described elsewhere in this disclosure.

Some embodiments may use a cascade of finite state matching algorithms to a natural-language-text document to extract the hierarchical structure and resolve references. For example, some embodiments may perform one or more various operations to parse a natural-language-text document into a set of text sections based on whitespaces (e.g., multiple spaces, a line break, etc.) using a finite automata matching algorithm to generate a structured document. Some embodiments may parse a natural-language-text document using one or more delimiters, where a delimiter may include whitespace, a symbol, punctuation (e.g., a comma, semicolon, colon, period, etc.), a character, a pattern of characters, other types of n-grams, a set of formatting tags, a set of metadata tags, a set of markup language tags, or the like. As discussed elsewhere in this disclosure, some embodiments may use headers or other text elements to segment a natural-language-text document into different text sections, where the different text sections may be structured to mimic a clause hierarchy shown in the natural-language-text document. Some embodiments may then generate a list of clauses or other extracted text sections, where each extracted text section may indicate the prior text in the hierarchy of clauses. As described elsewhere in this disclosure, some embodiments may then determine whether the text section includes one or more trigger phrases or other set of n-grams that is mapped to a category value representing a deontic category.

Some embodiments may determine text boundaries in multiple steps or otherwise repeat one or more operations described in this disclosure to determine different types of text sections. For example, some embodiments may determine a first set of text sections based on text headers indicated by text formatting and then determine a second set of text sections based on enumerated lists, where text headers or portions of text headers may then be used as parameters of their corresponding text section. Some embodiments may pass a clause or other extracted text section to a natural language preprocessing stage that converts text into a token sequence, where natural language definition terms may be replaced by token equivalents of words in the token sequence. A token sequence may include various types of tokens, where a token may represent a reduced form of a word (e.g., a stemmed or lemmatized version of a word), the word itself, or the like. For example, some embodiments may generate a token sequence "[('3.21 (iv)(b)', 'client', 'is', 'permitted', 'to', 'acquire', 'items', 'in', 'section', '7.89(i)', '.']" based on the clause "(3.21(iv) (b) client is permitted to acquire items listed in section 7.89(i)." As described elsewhere in this disclosure, some embodiments may then generate a sequence of embedding vectors representing the tokens or other n-grams of the clause in an embedding space representing a feature space of the words of the natural-language-text document. Furthermore, as described elsewhere in this disclosure, some embodiments may retrieve a stored set of entity identifiers and determine whether a word, phrase, or another sequence of strings of a text section is stored as an entity identifier. If a determination is made that the sequence of strings is the identifier or otherwise includes the identifier, some embodiments may determine that the sequence of strings is a lexical item or another element representable as a single token, where an embedding vector may be generated based on the sequence of strings or token representation of the sequence of strings.

Some embodiments may determine parameters associated with text sections based on list structure, enumeration, whitespace, punctuation, formatting, markup language tags, some combination thereof, or the like. For example, some embodiments may use a combination of keywords and newlines to determine boundaries for a text section and then select category values to assign to the text section based on the keywords. In some embodiments, the category values may be selected from a set of categories including the labels "definitions," "prices," "disclaimers," or the like, where the category values may be distinct from category values corresponding with category values of a data model object indicating whether a detected proposition may be a right, obligation, or proposition. In some embodiments, category values for text sections may be pre-assigned to different combinations of text elements such as white spaces, keywords, structures, formatting, markup tags, or the like. Alternatively, or in addition, some embodiments may modify associations between category values and combinations of text elements based on detected features of a text. For example, some embodiments may determine that text sections are delimited by semicolons at a first text section and that text sections are delimited by periods and commas at another text section.

As used in this disclosure, a text section may include other text sections. For example, a first text section may include a paragraph, where the first text section may include a second text section and third text section, where the second and third text sections represent first and second sentences of the paragraph, respectively. The third text section may include a fourth text section and fifth text section, where the fourth and fifth text sections represent first and second clauses of the first sentence, respectively. As described elsewhere in this disclosure, some embodiments may generate a conditional statement based on a clause, where the conditional statement may be structured in a specific format associated with data model entities. For example, a conditional statement may include a first list to store or identify a first set of semantic triples and a second list to store or identify a second set of semantic triples, where the first list is to be used as conditions of the conditional statement, and where the second list is to be used as consequent outcomes of the conditions being satisfied or not satisfied.

In some embodiments, the natural language text document may include metadata tags, such as tags of a markup language. Some embodiments may generate one or more text sections or otherwise use these tags to determine relations between different text sections, different conditional statements of the text sections, or the like. For example, some embodiments may obtain a natural language text document in the form of a markup language, where different sections of the document may include hidden tags such as "<label="exceptions">" that indicate labels to assign two different text sections. Furthermore, as described elsewhere in this disclosure, some embodiments may generate or update a document to include markup tags, where the markup tags may be generated from a semantic map or another set of data model objects described in this disclosure.

In some embodiments, operations of the process 300 may include determining a set of embedding sequences or other set of learned representations associated with the set of clauses or other text sections, as indicated for block 320. A learned representation may include one or more types of values, such as Boolean values, numeric values, category values, or the like. For example, some embodiments may generate a set of learned representations for text data by generating a set of embedding vectors as the set of learned representations. An embedding vector may include a vector having multiple numeric values in a multi-sense embedding space, where each dimension of the embedding space may represent a feature of a natural language domain. Some embodiments may determine embedding vectors for some or all of the words of a text using a set of learning model parameters of a machine learning model. Alternatively, or in addition, some embodiments may determine embedding vectors for lexical items. For example, some embodiments may generate a first set of embedding vectors for words or parts of words of a first text section.

The embedding space of an embedding vector may include multiple vector dimensions, such as more than two dimensions, more than 20 dimensions, more than 200 dimensions, more than 2000 dimensions, or the like. In some embodiments, the embedding space of an embedding vector may include fewer dimensions than a cardinality of the words, lexical items, or other n-grams of a natural-language-text document. For example, some embodiments may obtain a natural language text document that includes over 100,000 words and represent the n-gram of the document with embedding vectors in an embedding space having fewer than 100,000 dimensions.

Some embodiments may generate an embedding vector or other learned representation using a machine learning model to otherwise reduce a high-dimensional representation of the parts of speech and lexical items to embedding vectors of an embedding layer. For example, some embodiments may use a recurrent neural network model, bidirectional recurrent neural network model, or transformer neural network model to generate a sequence of embedding vectors (embedding sequence). Some embodiments may determine an embedding vector associated with an n-gram using a model based on both the n-gram itself and the context surrounding the n-gram (e.g., other lexical items surrounding a lexical item, the corresponding embedding vectors, etc.). For example, some embodiments may use a bidirectional long short term memory (LSTM) neural network model or another recurrent neural network to generate encoding vectors. One such neural network model that may be used is described in Embeddings from Language Models (ELMo), as described by Peters et al. (Peters, M. E., Neumann, M., Iyyer, M., Gardner, M., Clark, C., Lee, K. and Zettlemoyer, L., 1802. Deep contextualized word representations. arXiv 2018. arXiv preprint arXiv:1802.05365), which is hereby incorporated by reference in its entirety. By determining embedding vectors or other learned representations of a set of words, a set of lexical items, or other n-grams based on their surrounding words, surrounding lexical items, or other context, some embodiments may encode differences in the meaning of text in cases where words or lexical items may have similar or identical spelling.

As described elsewhere in this disclosure, some embodiments may use a machine learning model such as a recurrent neural network model to predict or categorize values. For example, some embodiments may operate on unbounded sequences of n-grams or embedding vectors, where the sequences may be processed in the order of the sequence to maintain a state that is dependent on a current input and a previous state during the use of the recurrent neural network model. As described elsewhere in this disclosure, the recurrence of the neural network layers of a recurrent neural network may be bidirectional, such that intermediate outputs of a neural network layer may be processed in both a forward and backward order to permit a state to encode future and past contexts. In some embodiments, such as in the case of using a LSTM neural network or gated recurrent unit (GRU) neural network, neurons of a neural network may include internal memory gate parameters, where the internal memory gate parameters may modify stored state values in a manner analogous to 'remembering' or 'forgetting' a past state when determining a future value. Furthermore, one or more of the machine learning models described in this disclosure may include deep neural networks, where deep neural networks may include more than three neural network layers.

Some embodiments may also modify or otherwise update learning model parameters based on a selected domain category associated with a natural-language-text document. For example, a machine learning model may use a first set of neural network model parameters associated with a domain category labeled "domain1" to generate embedding vectors for an embedding sequence of a first natural-language-text document in response to a determination that the first natural-language-text document is associated with the domain category "domain1." In response to a determination that a second natural language is associated with the domain category "domain2," some embodiments may select a second set of neural network model parameters associated with a domain category labeled "domain2" to generate embedding vectors for an embedding sequence of the second natural-language-text document. Furthermore, some embodiments may adaptively determine one or more model parameters based on a selected or matched graph template using one or more operations described in U.S. patent application Ser. No. 17/015,074, filed Sep. 7, 2020, titled "ADAPTIVE PARAMETER TRANSFER FOR LEARNING MODELS," which is hereby incorporated by reference in its entirety.

Some embodiments may also determine a sequence of parts-of-speech values for words, tokens, lexical items, or embedding vector representations thereof, where different words or n-grams may share a same parts-of-speech value. For example, some embodiments may use a dictionary or stored set of definitions to assign values such as grammar categories to different lexical items or other n-grams of a text section, where some embodiments may assign a respective parts-of-speech value to each respective lexical item of a text section. As described elsewhere in this disclosure, some embodiments may then use the sequence of parts-of-speech values in combination with embedding vectors or other values to categorize a text section, determine a subject entity, or determine a text section indicating a proposition or portion of a proposition.

In some embodiments, operations of the process 300 may include determining a set of semantic triples or other data model objects that include a set of category values based on the set of embedding sequences using a machine learning model, as indicated by block 324. In some embodiments, a semantic triple may include a first field, a second field, and a third field. The first field may represent a subject entity, the second field may represent a category value indicating a deontic category, and the third field may represent another data entity representing a proposition or text from the text section. For example, the first field of a semantic triple may be populated with the value "entity01," where "entity01" is an identifier of a first entity stored in a list of authorized entities. The second field of the semantic triple may be populated with the value "right," which may be selected from a list of category values ["right"; "obligation"; "prohibition"], where the category value may be selected with respect to the first field value. The third field may be populated with the text from a text section representing a proposition. Alternatively, or in addition, the third field of the semantic triple may be populated with another data model object, such as a semantic double. For example, the third field may be populated with the semantic double '("to make", "45 widgets")' using a machine learning model to categorizing which sequence of strings correspond with a grammatical predicate and a grammatical object, respectively.

As described elsewhere in this disclosure, some embodiments may use a machine learning model to determine one or more values used to populate fields a data model object such as a semantic triple or values associated with a semantic triple. For example, some embodiments may use a trained neural network model to determine a verb predicate value and a subject entity of a clause. Also, as described elsewhere in this disclosure, some embodiments may use parts-of-speech values in conjunction with embedding vectors as inputs to a recurrent neural network model to determine category values or other values described in this disclosure. For example, some embodiments may provide a concatenation of an embedding sequence and a sequence of parts-of-speech values to a machine learning model during a first timestep to generate an intermediate output state including a corresponding intermediate output category value. Some embodiments may then, during a later timestep, provide the intermediate output in conjunction with the embedding sequence and the parts-of-speech values to the recurrent neural network model to determine a first category value. For example, for a noninitial, non-terminal embedding vector of the first embedding sequence, such as a third embedding vector of an embedding sequence having at least five embedding vectors, some embodiments may determine intermediate outputs using a recurrent neural network model that are used to generate subsequent outputs. For example, some embodiments may use a neural network layers of a neural network model to generate a first intermediate output based on a first embedding vector representing the first word of a clause. Some embodiments may then use the neural network layers to generate a second intermediate output based on both the first intermediate output and a second embedding vector representing a second word of the clause and use the neural network layers to generate a third intermediate output based on both the second intermediate output and a third embedding vector representing a third word of the clause. Some embodiments may repeat the above operations of using a previous output as an inputs for later iterative uses of a neural network model to determine a final output, such as a category value.

Some embodiments may determine semantic triple directly from text of a text section without using embedding vectors or other learned representations of the text sections. Some embodiments may determine a semantic triple based on matching keywords or metadata tags that indicate which portions of a text sections map to a field of a data model object. For example, some embodiments may receive an indication that a text section includes a semantic triple using a set of pattern-matching operations that causes a determination that any phrase including the word "must" is a condition of a conditional statement that is then reduced to one or more semantic triples.

Some embodiments may determine a set of candidate subject entities based on an embedding sequence using a machine learning model. For example, some embodiments may use a trained machine learning model to predict which sequence of strings to identify as a subject entity identifier. Some embodiments may then compare the candidate subject entities to a stored set of entities, where the stored set of entities may be represented as a stored set of entity identifiers indicating entities having user accounts. Some embodiments may detect that a set of n-grams identifying a candidate subject entity is directly stored in a repository storing records representing a stored set of entity identifiers. Alternatively, some embodiments may detect that a set of n-grams identifying a candidate subject entity is a subset of a second entity, where the second entity is stored in a repository storing records representing a stored set of entity identifiers. For example, some embodiments may determine that "loan originator" is a candidate subject entity. Some embodiments may then determine that "loan originator" is a role assigned to an entity identified as "entity123." In response to detecting the indirect identification of an entity, some embodiments may then determine that the candidate subject entity is an entity identified by the stored set of entity identifiers and populate a subject entity field of a semantic triple or other data model object with the candidate subject entity.

As described elsewhere in this disclosure, some embodiments may use the embedding sequence to determine a set of values based on the embedding sequence, where the set values may include an entity identifier, a category value representing a deontic category, a semantic double, or the like. Some embodiments may extract text sections of a natural-language-text document and store the text sections in the form of a directed graph structure, where graph vertices of the directed graph structure may represent clauses, and where graph edges of the directed graph may correspond with parent-child relationships between clauses or other indicated references between clauses. Some embodiments may further augment vertices or edges with associated information such as the corresponding clause text or a data model object extracted from the clause text.

Some embodiments may determine a sets of linkage scores between different embedding vectors of embedding sequences. For example, some embodiments may, for each pair of embedding vectors of a first embedding sequence, determine a respective linkage score using a machine learning model in conjunction with a set of learning model parameters retrieved from a repository of machine learning model parameters. In some embodiments, the linkage score may be determined as a summation over some or all embedding-pair scores of an embedding sequence indicating a likelihood that an n-gram will follow another n-gram. For example, an embedding-pair score between a first word and a second word may be or be based on a likelihood that a pair of words or other n-grams may follow each other ("pairwise likelihood") in an extractive summary. Some embodiments may use a set of learning model parameters obtained by training a machine learning model with a training set to determine pairwise likelihoods, where training the machine learning model may include minimizing or maximizing an objective function result of an objective function.

Various objective functions may be used, where a choice of an objective function or a loss function used to generate the objective function may be used to determine the effect that a context surrounding a word, phrase, or other n-gram has on a predicted value. Furthermore, some embodiments may perform a text extraction operation in multiple phases using a machine learning model. Some embodiments may compute a set of word-pair scores between each pair of words using a set of machine learning model parameters to determine a verb predicate value of a text section, where a verb predicate value may include a sequence of characters representing a verb used to join a clause subject with a clause object. For example, some embodiments may use a binary predicate detection algorithm by determining a set of probabilities and then determining a set of pairwise likelihoods indicating the likelihood that embedding vectors are paired (e.g., follow). In some embodiments, the pairwise likelihoods may be used to determine a loss term or other linkage score, where the linkage score may have the expression "$-(1-p) \log(1-\hat{p}_\theta) - p \log \hat{p}_\theta$," where p may represent a training probability obtained from a training set and $\hat{p}_\theta$ may represent a predicted probability determined with the use of a machine learning model. As described in this disclosure, a linkage score may include any score indicating a relationship between different words, n-grams, or embedding vectors of a same text section or different text sections. Some embodiments may use summation over some or all of the embedding vectors of one or more clauses as an objective function result when training a machine learning model to minimize this loss function to determine a set of machine learning model parameters for the machine learning model. Various other loss functions may be used when performing a set of training operations. For example, some embodiments may use, as a loss function, the expression for a sum "$\Sigma_l p_l \log \hat{p}_{\theta,l}$", where l may represent an index value for the indices corresponding with verb predicate labels. Some embodiments may use the loss function to determine an objective function based on a sum over the sums used to train a machine learning model, where the sum over the sum causes the summation of the respective sum for each n-gram and each clause of a natural-language-text document.

Some embodiments may use one or more loss component expressions described above to train a machine learning model to recognize a predicate value, where a machine learning model may be trained to minimize or maximize a corresponding objective function result to determine which n-grams of a clause or other text section is a verb predicate. It should also be noted that the above examples of a loss function or objective function are examples, and other loss functions or objectives functions may be used. Furthermore, some embodiments may further cross-reference detected predicate values with a set of words representing of negation terminology, such as "become unable" or "fail." As described elsewhere in this disclosure, some embodiments may assign a tag to an association between data model objects or with one or more categories based on a detection of a word stored in the set of words representing negation terminology. Furthermore, some embodiments may perform one or more validation operations to determine whether a detected predicate value is listed. For example, some embodiments may assign a verb detected by a machine learning operation as a predicate value after validating the verb. In some embodiments, such validation may be performed by determining whether the verb is a value of a stored set of predicate values.

After determining a verb predicate of a text section, some embodiments may classify a subject entity or object entity of a text section. Some embodiments may determine a subject entity or an object entity based on a detected verb predicate using one or more operations described in patent application 63/134,872, filed on Jan. 7, 2021, titled "STRUCTURED SEMANTIC CONTRACT MAPS." For example, to determine a subject entity or an object entity, some embodiments may train a machine learning model using a joint binary classification algorithm by minimizing a total cross-entropy loss based on a detected verb predicate. Some embodiments may use a same machine learning model used to determine the set of predicate values, where a different set of learning model parameters may be used to detect subject or object values. Alternatively, or in addition, some embodiments may use a different machine learning model. For example, some embodiments may use a transformer neural network model to determine a predicate value and use a GRU neural network model to determine a subject entity. Various types of entropy loss formulations may be used, where some embodiments may use an entropy loss formulation that determines loss terms between each subject or object n-gram and a detected predicate value. Some embodiments may then use the determined subject identified by the machine learning model to determine a subject entity for a semantic triple.

Some embodiments may perform one or more delimiting operations to determine a subject entity to populate a field of a semantic triple or other data model object. Some embodiments may use a hybrid approach to combine different information extraction techniques. For example, some embodiments may delimit a first continuous subsection of text (e.g., a left continuous subsection) of a sequence and then using a neural network or another machine learning model to determine a category value based on the delimited section. The continuous subsection of text may be determined based on a sequence position that is associated with a detected verb predicate or other predicate value. For example, some embodiments may use a machine learning model to determine that a clause includes the verb predicate "to make." Some embodiments may then determine that the verb predicate "to make" is at a sequence position "90," where the sequence position may be at an initiating position or terminal position of the verb predicate. Some embodiments may then determine subject entity based on a continuous subsection of text that begins at the start of a clause and ends at the sequence position 90. Similarly, some embodiments may determine an object entity or other object value based on a second continuous subsection that begins at the sequence position 90 and ends at the end of the clause.

Some embodiments may use a set of linkage score to determine a subject entity or object entity, where the set of linkage scores may be equal to or based on linkage probabilities between words or other n-grams of a clause or embedding sequence of the clause. For example, some embodiments may implement a Viterbi algorithm or beam search algorithm to determine a subject entity of a clause based on a set of linkage scores between pairs of n-grams of the clause, where the set of linkage scores may indicate pairwise likelihoods that corresponding pairs of words or other n-grams follow each other. Some embodiments may determine a first set of linkage scores between embedding vectors of the first embedding sequence by, for each respective pair of embedding vectors of the first embedding sequence, determining a respective linkage score. Some embodiments may then determine a set of partial objectives indicating a total probability value that a prediction ends in a predicted n-gram based on the first set of linkage scores. For example, a partial objective may be equal to the expression "$J(\alpha) = \Sigma_{i=0}^{m} \log \hat{p}_{\alpha_i, \alpha_{i+1}}$," where $\hat{p}_{\alpha_i, \alpha_{i+1}}$ may represent a predicted probability value. Some embodiments may quickly compute a set of summation values to represent partial objectives for each iteration, where the summation value J(j) may be computed as $$"J(j) = \max_{0 \leq i < j} J(i) + \log \hat{p}_{i,j},"$$

where i and j may represent a linkage probability or other linkage score between an n-gram at position i and an n-gram at position j. The summation value of the set of logs of the probability values may be computed for a threshold number of iterations to determine a maximum summation value of a set of summation values comprising summation values computed at each iteration. Some embodiments may then determine a subject entity based on the maximum summation value of a set of computed summation values.

Some embodiments may use a breadth first search, such as a beam search, to determine a subject entity or an object entity. For example, some embodiments may use a beam search having a beam width of k to determine a subject entity. When implementing a beam search operation, some embodiments may maintain a list of k best candidate paths, where k may be an integer. At each timestep of the beam search operation, the k best candidate paths are expanded one step in all possible ways, where the candidate paths may then be sorted and filtered to the k best candidate paths based on their updated likelihood values. Some embodiments may perform these operations for a threshold number of iterations to then use the most likely subject entity as the predicted subject entity.

Some embodiments may generate and use a set of attention values to perform one or more NLP operations to extract or categorize the text of a natural-language-text document, where the attention values may be used to weigh or otherwise modify an output of a neural network. Various methods may be used to determine or use attention values. For example, some embodiments may use a multi-headed attention-based autoencoder, such as autoencoders using a model similar to those described by Vaswani et al. (Vaswani, Ashish, Noam Shazeer, Niki Parmar, Jakob Uszkoreit, Llion Jones, Aidan N. Gomez, Łukasz Kaiser, and Illia Polosukhin. "Attention is all you need." In Advances in neural information processing systems, pp. 5998-6008. 2017, arXiv:1706.03762) or Devlin et al. (Devlin, J., Chang, M. W., Lee, K. and Toutanova, K., 2018. Bert: Pre-training of deep bidirectional transformers for language understanding. arXiv preprint arXiv: 1810.04805), which are incorporated by reference in their entirety.

Some embodiments may perform a set of training operations on a set of training documents to determine a set of query vectors, key vectors, and value vectors for each attention head of a multi-headed attention model during training. A query vector may indicate an n-gram position(s) in a sequence of n-grams, a key vector indicating the n-gram positions in the n-gram sequence, and a value vector may indicate a value generated from the text of the n-gram. During a training operation, some embodiments may learn the three vectors and combine them with each other query, key, and value vectors, respectively, of other n-grams of a text section being analyzed to generate a query matrix, key matrix, and value matrix for the text section. Some embodiments may then perform a set of element-wise operations, where the element-wise operations include performing a matrix multiplication operation between the query matrix and the key matrix and then multiplying a transpose of the resulting matrix with the value matrix to determine attention-weighted token for the n-grams of a text section. Some embodiments may then perform the above operations using different query, key, and value matrices for each attention head of a multi-headed attention model and concatenate the resulting matrices together to determine an output matrix. Some embodiments may then provide the output matrix as an input to a set of feed forward neural network layers to determine an additional set of outputs that may then be further processed to be decoded by a decoding neural network layer, where the decoding neural network layer may provide be used to provide one or more predictions. For example, the decoding neural network layer may be used to predict a category value representing a deontic category, such as whether a clause represents a "right," "obligation," or "prohibition."

Some embodiments may encode a data model object of a self-executing protocol in a programming language or another type of formal language. For example, a semantic triple or other data model object may be stored as a data structure encoding three different fields in a domain-specific programming language, a structured data format such as JSON, or the like. In some embodiments, a semantic triple, semantic double, or other data model object may be a part of or otherwise be associated with a conditional statement as a condition of the conditional statements. For example, some embodiments may use an encoded proposition of a semantic triple to generate a document. Alternatively, or in addition, values of a semantic triple or other data model object may be included in part or in whole as a set of conditions or outcome subroutines of a conditional statement.

In some embodiments, operations of the process 300 may include determining a set of associations between semantic triples or other data model objects based on a set of shared parameters of the data model objects or corresponding text sections, as indicated by block 332. Some embodiments may generate a set of semantic triples that are associated with each other using metadata based on text sections of the natural-language-text document. The association between a pair of different semantic triples or another pair of data model objects may be generated based on direct references between field values of the pair or data model objects. For example, a shared parameter between two data model objects may include a shared field value between a pair of data model objects. The shared parameter may be in the same respective field between the pair of data models. For example, some embodiments may generate a first semantic triple that includes the section text title "3.21(a)" and a second semantic triple that includes the section text title "3.21(a)(i)." Upon a determination that both section text title fields include the text "3.21(a), some embodiments may associate the first semantic triple with the second semantic triple. Alternatively, the shared parameter may be in different fields. For example, some embodiments may generate a first semantic triple that includes the text "to provide entity_2 with an amount of memory according to section 3.21(a)," generate a second semantic triple that includes the identifier "3.21(a)." Upon a determination that the second semantic triple includes the identifier "3.21(a)," some embodiments may associate the first semantic triple with the second semantic triple.

In some embodiments, a shared parameter between two data model objects may include a shared parameter between two text sections used to generate the pair of semantic triples. A shared parameter between two text sections may include a shared text sub-section, a shared parent text header, a shared document identifier, or the like. For example, a first clause may include or be a part of a text section identified by the identifier "section 3.21(a)(ii)" and a second clause may include or be a part of a second text section identified by the identifier "section 3.21(a)(iii)." Some embodiments may then determine that a first data model object that is generated from the first text section is associated with a second data model object that is generated from the second text section based on both text sections sharing the parent identifier "section 3.21(a)."

Alternatively, or in addition, a shared parameter between two text sections may include indirect references to a share parameter. For example, a shared parameter between two data model objects may include a first data model object that includes or is otherwise based on a first clause indicating that a first entity has an obligation "to delete all data listed in sections related to a user account within 30 days." Some embodiments may then use an NLP operation to analyze a second clause that recites, "administrator may revoke moderator access privileges upon failure to delete all data results" and determine that the second clause is associated with a third clause reciting "moderator has right to access user accounts based on access privileges." Based on the above, some embodiments may determine that the first and second data model objects are associated with each other, where some embodiments may associate an indicated proposition of the first data model object to the second data model object. For example, some embodiments may determine that the first data model object includes the semantic triple "("allocator", "obligation", ("to allocate", "300 units"))" and that a second data model object includes the semantic triple "("receiver", "right", ("to allocate", "300 units"))"

Some embodiments may store data model objects and associations between data model objects in a directed graph. In some embodiments, a graph vertex of a directed graph may be stored as a single record. Alternatively, or in addition, some embodiments may store a graph vertex of a directed graph as a plurality of records or as values of a plurality of records. For example, some embodiments may store a first array that includes graph vertex identifiers, where sub-arrays identified by the graph vertex identifiers include pointers to the address of other values stored in other records that are indexed by a different set of identifiers. A record of the graph vertex may include a respective graph vertex identifier and a respective set of values stored at a corresponding address of other values indicated by a respective set of pointers associated with the respective graph vertex identifier, even if the other values are stored in a second record.

As described elsewhere in this disclosure, some embodiments may associate each graph vertex of the directed graph with its semantic triple or other data model object. For example, some embodiments may, for each semantic triple of a set of semantic triples, add a graph vertex to a directed graph that includes or is otherwise associated with an entity identified by the semantic triple, a category value representing a deontic category, and a set of text determined by a machine learning model to include a proposition. In some embodiments, the graph vertex may also include the text section used to generate graph vertex. Alternatively, some embodiments may store or otherwise associate multiple semantic triples with a graph vertex. For example, some embodiments may generate a graph vertex based on detected sections of a natural-language-text document using a machine learning model, where each graph section may include data extracted from multiple semantic triples based on listed entities of the semantic triples.

As described elsewhere in this disclosure, a conditional statement may be structured to use data obtained from one or more data model objects, such as semantic triples or semantic doubles, in a condition or an outcome of the conditional statement. Some embodiments may generate a conditional statement based on a set of data model objects and associations between data model objects. For example, some embodiments may determine that a first semantic triple is associated with a second data model object using one or more operations described above. The association may be assigned with the category of "outcome," where the first semantic triple may include a category value "obligation" with respect to a first entity "entity_1," and where the proposition may be stored as "provide twenty kilojoules to entity_2." Similarly, the second semantic triple may include a category value "right" with respect to a second entity "entity_2," where the proposition may be stored as "take thirty kilojoules from entity_1 in four days." Some embodiments may then generate a natural language text that recites "if entity_1 does not provide twenty kilojoules to entity_2, entity_2 is permitted to take thirty kilojoules from entity_1 in four days." Alternatively, or in addition, some embodiments may generate a computer-interpretable conditional statement such as "if provided(entity_1, entity_2, 20)==false {allocate(entity_1, entity_2, 30, 4)}."

In some embodiments, operations of the process 300 may include causing the presentation of a visualization including shapes representing semantic triples or text associated with semantic triples and a set of associations between semantic triples, as indicated by block 336. As used in this disclosure, a shape may include a line, a polygonal shape, an ovaloid shape or another type of curved shape, or the like. For example, a first shape may include text of a first text section, where UI elements of the shape, UI elements that partially or completely overlap the shape, or UI elements that are in proximity to the shape may indicate elements of a data model object. For example, a UI element within a shape may include an indication of an entity having an account in an account record, an indication of whether the data model object stores a proposition that is a right, obligation, or prohibition with respect to the entity, proposition text such as a sequence of words determined to be part of a verb predicate or an object, or the like.

In some embodiments, operations of the process 300 may include storing a data structure that includes the semantic triples or other data model objects generated from the natural-language-text document and associations between the data model objects in memory, as indicated by block 340. Various data structures may be used to store structured data generated from a natural-language-text document. For example, some embodiments may store the data structure in a resource description framework (RDF) database (i.e., triplestore database). As described elsewhere in this disclosure, some embodiments may store structured data in a SQL database, a key-value pair database, or another type of database. In some embodiments, storing a data structure that includes the generated data model objects may include serializing the data structure and then storing the serialized form of the data structure. Some embodiments may store the data model in a non-volatile local persistent memory device, such as a spinning hard drive or solid-state drive. Alternatively, or in addition, storing the data model objects may include storing the data structure on a decentralized, tamper-evident data store. For example, some embodiments may store one or more data object models on a decentralized tamper-evident data store such as the Interplanetary File System. Furthermore, during or after storing a semantic map or other structured data, some embodiments may combine conditional statements with other semantic maps. For example, some embodiments may perform operations to determine an aggregated parameter by combining parameters of data model objects using one or more operations described in U.S. patent application Ser. No. 17/015,042, filed Sep. 7, 2020, titled "MULTIGRAPH VERIFICATION," which is hereby incorporated by reference in its entirety.

Figure 4:
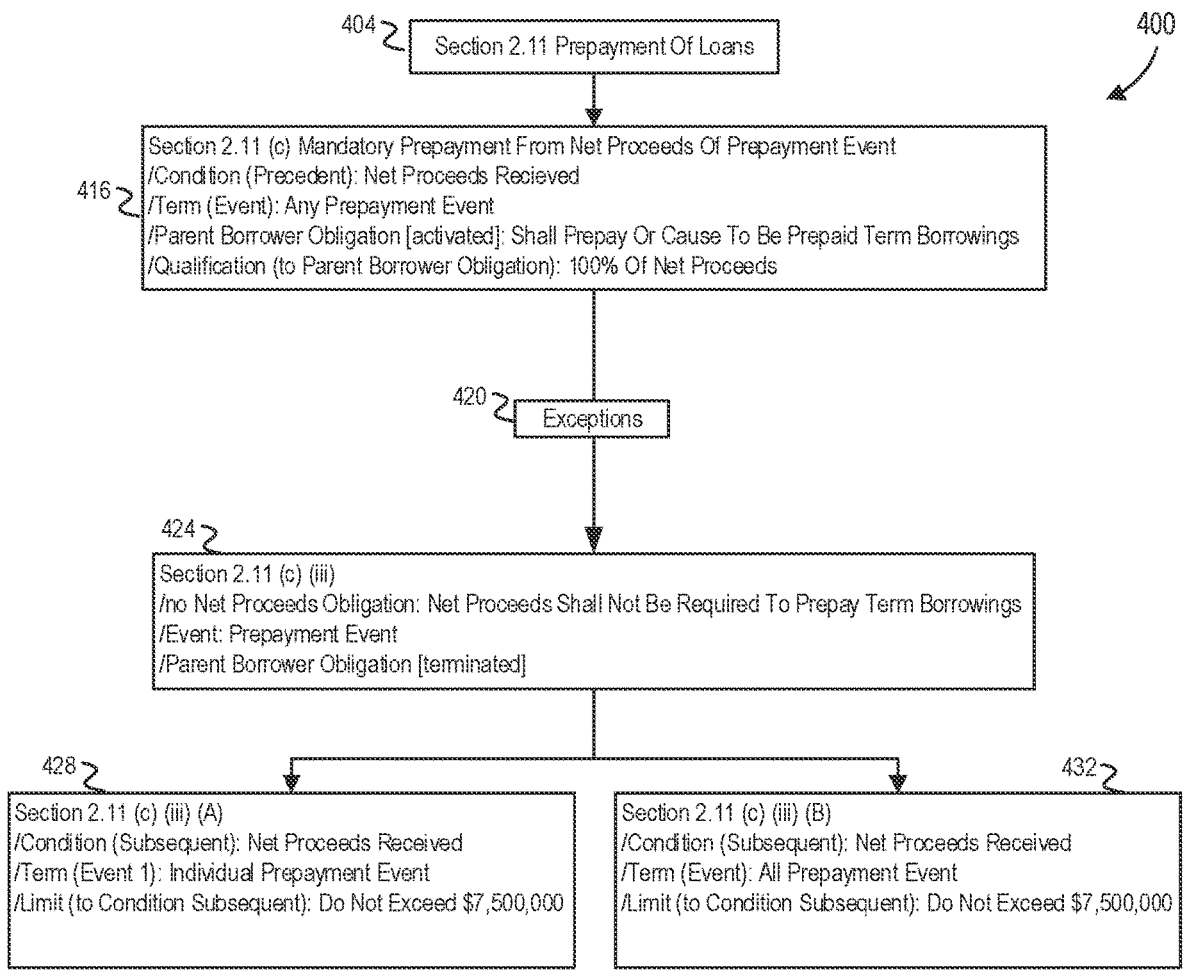
FIG. 4 shows an example visualization of a semantic map generated from a natural-language-text document, in accordance with some embodiments of the present techniques.

FIG. 4 shows an example visualization of a semantic map generated from a natural-language-text document, in accordance with some embodiments of the present techniques. As stated elsewhere in this disclosure, some embodiments may store structured data generated from natural-language-text documents in a graph database. In some embodiments, a version of a graph data structure may include graph vertices that represent different sections of a natural-language-text document, conditional statements extracted from a natural-language-text document, data model objects such as semantic triples or semantic doubles of the conditional statements, subjects obtained from the data model objects, or the like. The graph visualization 400 includes a first label 404 representing a text section header, where the text "section 2.11 prepayment of loans" may be directly extracted from a natural-language-text document. The first label 404 represent a parent text header that is a header for the text sections used to generate a graph vertex 416. In some embodiments, the properties associated with a graph vertex may be used as a category value for the graph vertex and any text section represented by the graph vertex or otherwise be used to indicate a category value.

The graph vertex 416 indicates a portion of a conditional statement that includes a previous condition "net proceeds received" that must be satisfied and stores this previous condition in the property "/Condition." As described elsewhere in this disclosure, some embodiments may use a machine learning model to extract this information into a set of data model objects and then use the set of data model objects to determine a graph vertex. Similarly, some embodiments may use the machine learning model to extract other elements and assign them to properties associated with the graph vertex 416 such as "/Term." Some embodiments may use the machine learning model to generate a semantic triple that is representable in the text form "('Borrower', 'Obligation', 'shall prepay or cause to be prepaid term borrowing.')." Some embodiments may then use this triple to augment the graph vertex with the property"/parent borrower obligation [activated]: shall prepay or cause to be prepaid term borrowing." Some embodiments may further augment a graph vertex representing a text section with quantitative values extracted from a text section. For example, the graph vertex 416 may include the text "/Qualification", where the term "/Qualification" may indicate additional data that may be relevant to a condition or outcome of an obligation, right, or prohibition.

As described elsewhere in this disclosure, some embodiments may use one or more machine learning models to label different text sections of a natural-language-text document based on learning parameters, keyword matches, key lexical item matches, or the like. For example, some embodiments may then determine, based on a shared header of the first text section and a second text section, that a graph vertex 424 is a child vertex of the graph vertex 416, where the shared header includes the text "section 2.11 (c)." Some embodiments may use a machine learning model to determine that the text used to generate the graph vertex 424 includes a negation term "shall not" and, based on a detection of the negation term, label the association between graph vertex 424 and the graph vertex 416 with the category value "Exceptions," as indicated by the label 420. Based on the text of the text section associated with the label "section 2.11(c)(iii)," some embodiments may further determine that this corresponds with a cancellation event of a previously recited obligation indicated by the graph vertex 416.

As indicated by the graph visualization 400, some embodiments may associate multiple graph vertices as child vertices of a parent vertex. For example, the graph visualization 400 further includes a graph vertex 428 and a graph vertex 432, which are shown as child vertices of the graph vertex 424. The graph vertex 428 may be generated based on a text section labeled with a text header "Section 2.11 (c) (iii) (A)." The graph vertex 432 may be generated based a second text header "Section 2.11 (c) (iii) (B)." Some embodiments may determine that the graph vertex 428 is a child vertex of the graph vertex 424 based on a determination that the graph vertex 428 and the graph vertex 432 shares the text section label "Section.211(c)(iii)" with the graph vertex 424.

Figure 5:
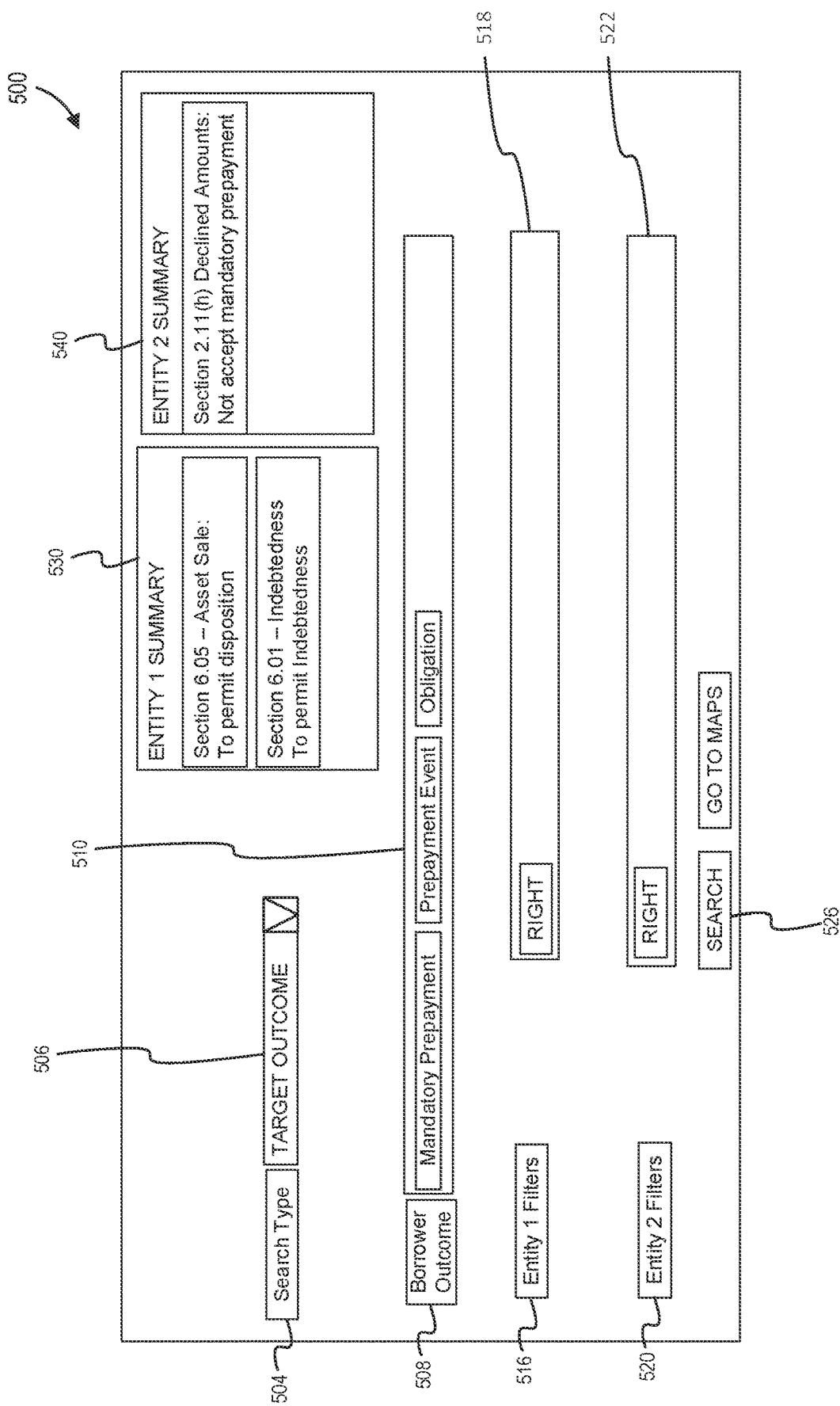
FIG. 5 shows an example user interface of a self-executing protocol search interface, in accordance with some embodiments of the present techniques.

FIG. 5 shows an example user interface of a self-executing protocol search interface, in accordance with some embodiments of the present techniques. Some embodiments may provide a UI that displays options for a user to generate a query through a data structure generated from a natural-language-text document, or the like. The UI 500 may provide a UI element 504 to indicate a specific search type such as a target outcome, as indicated by the UI element 506. In some embodiments, the UI 500 may be displayed on a client computing device, where the code to present the UI 500 may be sent from a server or cloud computing service. The UI element 508 may indicate one or more search filters of the search type indicated by the UI element 506. The first category search bar 510 may be a UI element that allows a user to select one or more category values used by the search filter indicated by the UI element 508. Some embodiments may further include a UI element 516 that indicates that category values displayed in the UI element 518 applies to an entity identified in the UI element 516. For example, the search indicated by the UI 500 includes a filter for text sections categorized with the category value "right" for the entity "entity_1." The UI 500 includes a UI element 520 that indicates the category values displayed in the UI element 522, which may indicate that the search should a filter for text sections categorized with the category value "right" for the entity "entity 2."

In some embodiments, an interaction between the user and the UI element 526 may cause a client computing device to submit a web message that includes a query to a server. After receiving the query, some embodiments may provide a response to the client computing device that may include a query result. Some embodiments may provide the query result in the form of text data used to provide a summary of text sections corresponding to each of the entities, where a first summary 530 indicates to text sections of a natural-language-text document associated with a category value "right" corresponding with the entity "Entity 1." Similarly, some embodiments may provide a second summary 540 that indicates text sections of the natural in which document associated with a category value "right" corresponding with the entity "Entity 2."

Figure 6:
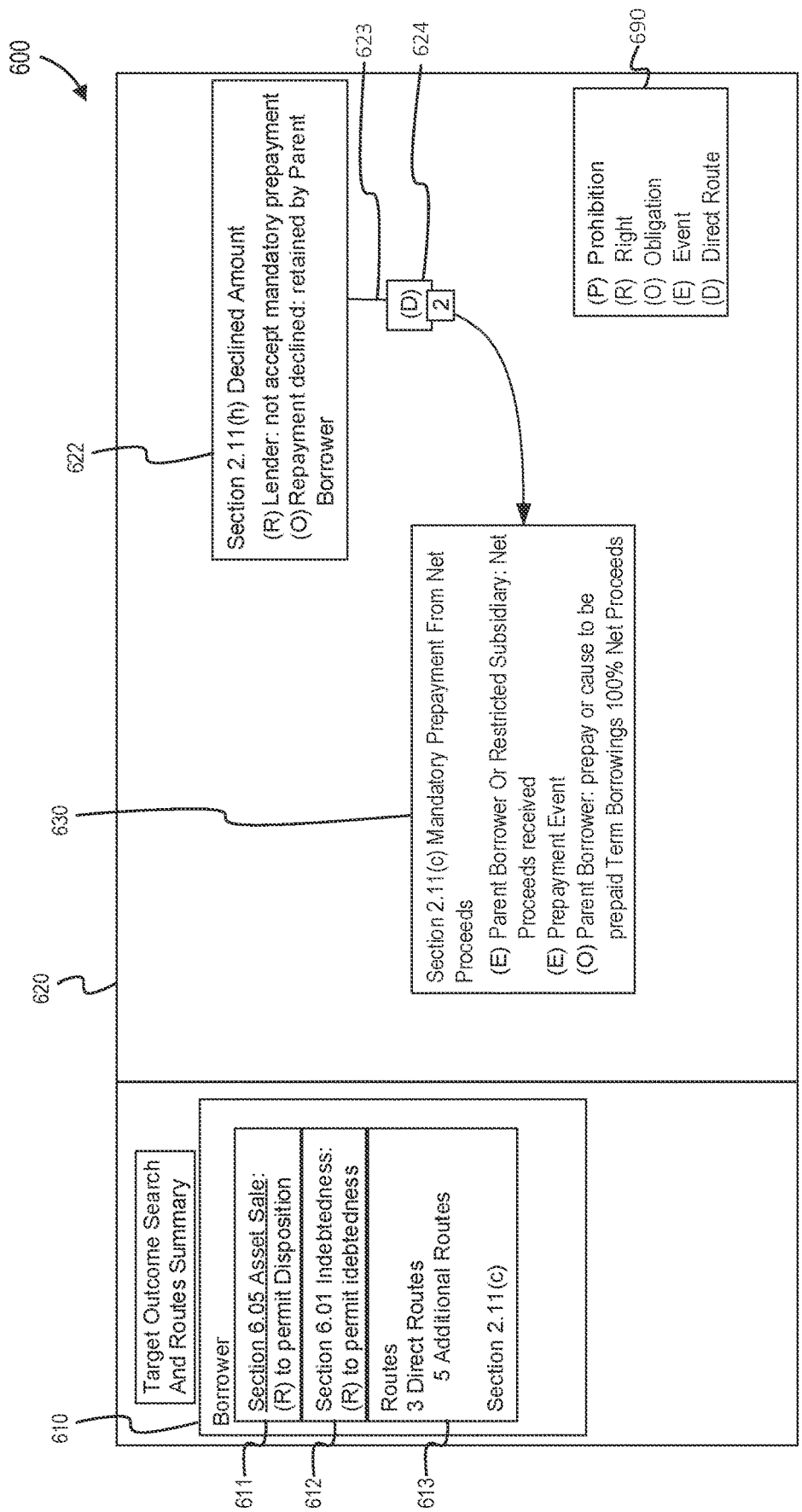
FIG. 6 shows an example user interface of a self-executing protocol search result, in accordance with some embodiments of the present techniques.

FIG. 6 shows an example user interface of a self-executing protocol search result, in accordance with some embodiments of the present techniques. Some embodiments may provide a UI 600 that displays a search result for a query of a data structure generated from a natural-language-text document. The UI 600 may include a first search summary 610 that includes a first box 611, a second box 612, and a third box 613. The first box 611 may include a section title "Section 6.05 Asset Sale," an indication of a category value "right," and a set of n-grams representing a proposition "to permit disposition." As described elsewhere, some embodiments may use a machine learning model to convert text of the natural-language-text document that has been associated with the text section labeled "Section 6.05 Asset Sale" into text of the natural-language-text document. The second box 612 may include a section title "Section 6.01 Indebtedness," a second indication of the category value "right," and a set of n-grams representing a proposition "to permit indebtedness." The third box 613 indicates a count of the direct routes and indirect routes with respect to state changes that may result to the activation, cancellation, or triggering of section 2.11(c), represented by the shape 630, which may represent a first graph vertex corresponding with the text section labeled "section 2.11(c)."

The UI 600 also includes a graph window 620 that displays a visualization that includes a first shape 622 representing a second graph vertex, where the first shape 622 renders a text section identifier "Section 2.11(h) Declined Amount" and two text lines corresponding with two different semantic triples corresponding with two different entities. The first text line includes the text "lender: not accept mandatory prepayment" and is in visual proximity with the symbol "(R)". As indicated by the key 690, the symbol "(R)" represents the category value "right," the symbol "(P)" represents the category value "prohibition," and the symbol "(O)" represents the category value "obligation." In addition, the key 690 may include symbols for a contract state associated with a text section. For example, the key 690 indicates that the symbol "(E)" indicates that a graph vertex of a smart contract is associated with an event and that the symbol "(D)" indicates that a route between graph vertices representing associations between data model objects is a direct route. In addition, the key 690 may indicate properties of an association between a semantic triples, conditional statements, or graph vertices that include data obtained from semantic triples or corresponding text sections. Furthermore, as shown in the shape 622, some embodiments may display a shape that indicates different deontic categories with respect to different subject entities, where the shape 622 indicates that the subject entity "Lender" has a right listed in section 2.11(h) and that the subject entity "Borrower" has an obligation listed in the section 2.11(h).

The shape 623 may be an arrow that connects the shape 622 with the shape 630, where the shape 623 may be generated based on a detected association between the first and second graph vertices. The UI 600 also includes a visual indicator 624 that indicates that the association between the first and second graph vertices is a direct route, where a direct route may indicate that the text section used to generate the shape 622 may be in a same shared text section as the text section used to generate the shape 630. Furthermore, as shown in the shape 630, some embodiments may store or retrieve indicators or events that triggered a conditional statement associated with a graph vertex, such as "Parent Borrower or Restricted Subsidiary: Net Proceeds received" or "Prepayment Event."

Figure 7:
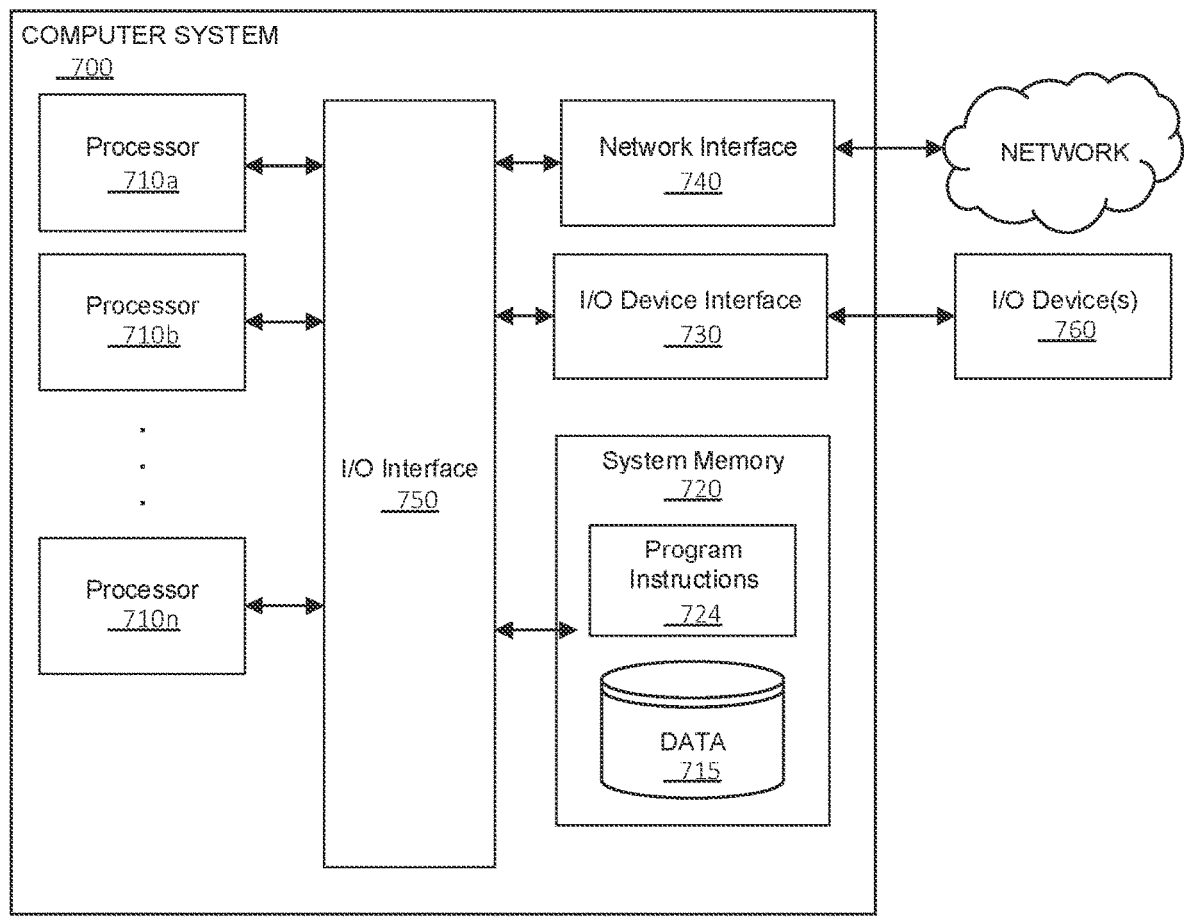
FIG. 7 show a computer system for generating a data structure based on a natural-language-text document, in accordance with some embodiments of the present techniques.

FIG. 7 show a computer system for generating a data structure based on a natural-language-text document, in accordance with some embodiments of the present techniques. FIG. 7 is a diagram that illustrates an exemplary computer system 700 in accordance with embodiments of the present technique. Various portions of systems and methods described herein, may include or be executed on one or more computer systems similar to computer system 700. Further, processes and modules described herein may be executed by one or more processing systems similar to that of computer system 700.

Computer system 700 may include one or more processors (e.g., processors 710a-710n) coupled to system memory 720, an input/output I/O device interface 730, and a network interface 740 via an input/output (I/O) interface 750. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computer system 700. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 720). Computer system 700 may be a uni-processor system including one processor (e.g., processor 710a), or a multi-processor system including any number of suitable processors (e.g., 710a-710n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computer system 700 may include a plurality of computing devices (e.g., distributed computer systems) to implement various processing functions.

I/O device interface 730 may provide an interface for connection of one or more I/O devices 760 to computer system 700. I/O devices may include devices that receive input (e.g., from a user) or output information (e.g., to a user). I/O devices 760 may include, for example, graphical UI presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 760 may be connected to computer system 700 through a wired or wireless connection. I/O devices 760 may be connected to computer system 700 from a remote location. I/O devices 760 located on remote computer system, for example, may be connected to computer system 700 via a network and network interface 740.

Network interface 740 may include a network adapter that provides for connection of computer system 700 to a network. Network interface may 740 may facilitate data exchange between computer system 700 and other devices connected to the network. Network interface 740 may support wired or wireless communication. The network may include an electronic communication network, such as the Internet, a local area network (LAN), a wide area network (WAN), a cellular communications network, or the like.

System memory 720 may be configured to store program instructions 724 or data 715. Program instructions 724 may be executable by a processor (e.g., one or more of processors 710a-710n) to implement one or more embodiments of the present techniques. Program instructions 724 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 720 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard drives), or the like. System memory 720 may include a non-transitory computer readable storage medium that may have program instructions stored thereon that are executable by a computer processor (e.g., one or more of processors 710a-710n) to cause the subject matter and the functional operations described herein. A memory (e.g., system memory 720) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 750 may be configured to coordinate I/O traffic between processors 710a-710n, system memory 720, network interface 740, I/O devices 760, or other peripheral devices. I/O interface 750 may perform protocol, timing, or other data transformations to convert data signals from one component (e.g., system memory 720) into a format suitable for use by another component (e.g., processors 710a-710n). I/O interface 750 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 700 or multiple computer systems 700 configured to host different portions or instances of embodiments. Multiple computer systems 700 may provide for parallel or sequential processing/execution of one or more portions of the techniques described herein.

Those skilled in the art will appreciate that computer system 700 is merely illustrative and is not intended to limit the scope of the techniques described herein. Computer system 700 may include any combination of devices or software that may perform or otherwise provide for the performance of the techniques described herein. For example, computer system 700 may include or be a combination of a cloud-computer system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 700 may also be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The term "set" may indicate a single item or a plurality of items, e.g., "set of widgets" may indicate only one widget or may indicate multiple widgets. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with a computer system, a natural-language-text document comprising a first clause and a second clause; determining, with the computer system, a first embedding sequence based on n-grams of the first clause and a second embedding sequence based on n-grams of the second clause; generating, with the computer system, a first data model object and a second data model object based on the first embedding sequence and the second embedding sequence, wherein: the first data model object comprises a first field populated with a first n-gram of the first clause and a second field populated with a first category; and the second data model object comprises third field populated with a second n-gram of the second clause and a fourth field populated with a second category; determining, with the computer system, an association between the first data model object and the second data model object based on a shared parameter of the first and second clauses; receiving, with the computer system, a query comprising the first category and the first n-gram; causing, with the computer system, a presentation of a visualization of the first and second data model objects in response to receiving the query, the visualization comprising: a first shape comprising the first n-gram and the first category; a second shape comprising the second n-gram and the second category; and a third shape comprising a first end that is connected to the first shape and a second end that is connected to the second shape based on the association between the first data model object and the second data model object; and storing, with the computer system, the first data model object and the second data model object in memory.

2. The medium of embodiment 1, wherein: the first embedding sequence is a first ordered list of embedding vectors each corresponding to one of the n-grams in the first clause; the second embedding sequence is a second ordered list of embedding vectors each corresponding to one of the n-grams in the second clause; the first data model object is a first semantic triple; and the second data model object is a second semantic triple.

3. The medium of embodiments 1 to 2, wherein generating the first and second data model objects comprises: determining a first candidate subject entity based on the first embedding sequence and a second candidate subject entity based on the second embedding sequence; determining whether the first candidate subject entity and the second candidate subject entity are entities identified by a stored set of entity identifiers; in response to a determination that the first and second candidate subject entities are entities identified by the stored set of entity identifiers, populating the first field with the first candidate subject entity and the second field with the second candidate subject entity; selecting the first category based on the first candidate subject entity and the second category based on the second candidate subject entity using a machine learning model; populating the second field with the first category and the fourth field with the second category.

4. The medium of embodiments 1 to 3, the operations further comprising: determining boundaries of a first text section based on a header of the first text section, wherein the header is bounded by at least one of a formatting tag, a newline, or a colon; and storing a stored set of entity identifiers based on n-grams of the first text section; determining whether a sequence of strings comprises an identifier of the stored set of entity identifiers; and in response to a determination that the sequence of strings comprises the identifier, determining that the sequence of strings is a lexical item of a set of lexical items, wherein generating the first embedding sequence comprises generating an embedding vector based on the lexical item.

5. The medium of embodiments 1 to 4, the operations further comprising: determining a domain category of the natural-language-text document; and selecting a machine learning model parameter of a plurality of machine learning model parameters based on the domain category, wherein using a machine learning model comprises using the machine learning model parameter.

6. The medium of embodiments 1 to 5, wherein generating the first data model object comprises: training a machine learning model to obtain a first set of machine learning model parameters based on an objective function result, wherein the objective function result is determined based on a summation of linkage scores between different embedding vectors, and wherein the linkage scores are determined based on a predicted probability of the machine learning model and a training probability of a training set; determining a set of probabilities indicating pairwise likelihoods of the first embedding sequence using the machine learning model based on the first set of machine learning model parameters; determining a first predicate value of the first clause based on the set of probabilities; validating the first predicate value based on a stored set of predicate values; selecting a sequence position based on an initiating position or terminal position of the first predicate value of the first clause; and selecting a first continuous subsection of the first embedding sequence based on the sequence position, wherein the first continuous subsection comprises an embedding vector representing the first n-gram, wherein generating the first data model object comprises determining a value of the first field based on the first continuous subsection.

7. The medium of embodiment 6, the operations further comprising: determining a second continuous subsection of the first embedding sequence based on the sequence position, wherein the second continuous subsection does not comprise an embedding vector representing the first n-gram; and populating a fifth field based on an embedding vector of the second continuous subsection using a machine learning model, wherein the fifth field is a field of the first data model object.

8. The medium of embodiments 6 to 7, the operations further comprising: retrieving a second set of machine learning model parameters; determining a second continuous subsection of the first embedding sequence based on the sequence position, wherein the second continuous subsection does not comprise a first embedding vector representing the first n-gram; determining a second embedding vector based on the second set of machine learning model parameters and the predicate value; and populating a third field of the first data model object based on the second embedding vector.

9. The medium of embodiments 1 to 8, wherein the first data model object is associated with a third data model object, the operations further comprising: determining whether the first clause comprises a word associated with a set of words representing a negation term; and assigning a tag associated with an association between the first data model object and the second data model object based on a determination that the clause comprises the word associated with the set of words.

10. The medium of embodiments 1 to 9, wherein storing the first and second data model objects comprises storing a data structure comprising the first and second data model objects in a distributed, tamper-evident data store of a peer-to-peer data-sharing network.

11. The medium of embodiments 1 to 10, wherein the first shape comprises: a first indication of the first category with respect to a first entity; and a second indication of the second category with respect to a second entity.

12. The medium of embodiments 1 to 11, wherein storing the first data model object and the second data model object in memory comprises storing a graph structure, the operations further comprising: updating the graph structure to comprise a first graph vertex of the graph structure based on the first clause, wherein the first graph vertex is associated with the first data model object; updating the graph structure to comprise a second graph vertex of the graph structure based on the second clause, wherein the second graph vertex is associated with the second data model object; and updating the graph structure to comprise a graph edge comprising an identifier of the first graph vertex and an identifier of the second graph vertex based on the association between the first data model object and the second data model object.

13. The medium of embodiment 12, the operations further comprising: indexing the first graph vertex based on the first category; wherein causing the display of the visualization comprises: retrieving the identifier of the first graph vertex based on the first category received via the query; retrieving the identifier of the second graph vertex based on the graph edge; and displaying text stored in association with the first graph vertex and the second graph vertex.

14. The medium of embodiments 1 to 13, wherein determining the association between the first data model object and the second data model object comprises: determining a set of text sections by segmenting the natural-language-text document based on formatting tags or whitespaces of the natural-language-text document; determining the shared parameter of the first and second clauses comprises by: determining a first parameter of the first clause based on a value of the first data model object; determining whether a field of the second data model object comprises the first parameter; and based on a determination that the second data model object comprises the field, determining that the shared parameter comprises the first parameter.

15. The medium of embodiments 1 to 14, further comprising: determining a first set of linkage scores between embedding vectors of the first embedding sequence by, for each respective pair of embedding vectors of the first embedding sequence, determining a respective linkage score; determining a set of summation values of logs of the first set of linkage scores, wherein each summation value of the set of summation values is associated with one or more embedding vectors of the first embedding sequence; and determining the first n-gram based on a maximum of the set of summation values.

16. The medium of embodiments 1 to 15, wherein determining the first embedding sequence comprises: generating a token sequence based on the first clause, wherein each respective token of the token sequence comprises a part of the first clause; and generating the first embedding sequence based on the token sequence, wherein each respective embedding vector is associated with a respective token of the token sequence.

17. The medium of embodiments 1 to 16, the operations further comprising: determining a first intermediate output of a machine learning model based on a noninitial, non-terminal embedding vector of the first embedding sequence, a second intermediate output, and a third intermediate output, wherein: the second intermediate output is determined based on a first embedding vector that is positioned before the noninitial, non-terminal embedding vector; and the third intermediate output is determined based on a second embedding vector that is positioned after the noninitial, non-terminal embedding vector in the first embedding sequence; and determining the first category associating the noninitial, non-terminal embedding vector with the first category based on the first intermediate output.

18. The medium of embodiments 1 to 17, the operations further comprising: determining a first sequence of parts-of-speech values corresponding with the first embedding sequence based on the first clause by, for each respective lexical item of the first clause, assigning a respective parts-of-speech value; providing, during a first timestep, the first embedding sequence and the first sequence of parts-of-speech values to a machine learning model to determine a first intermediate output; providing, during a second timestep, the first intermediate output, the first embedding sequence, and the first sequence of parts-of-speech values to the machine learning model to determine the first category.

19. The medium of embodiments 1 to 18, wherein determining the first data model object comprises steps for determining the first data model object.

20. The medium of embodiments 1 to 19, wherein determining the first embedding sequence comprises steps for determining the first embedding sequence.

21. A method to perform the operations of any of the embodiments 1-20.

22. A system, comprising: one or more processors; and memory storing instructions that when executed by the processors cause the processors to effectuate operations comprising: the operations of any one of embodiments 1 to 20.

What is claimed is:

1. A tangible, non-transitory, machine-readable medium storing instructions that when executed by one or more processors effectuate operations comprising:

obtaining, with a computer system, a natural-language-text document comprising a first clause and a second clause;

determining, with the computer system, a first embedding sequence based on n-grams of the first clause and a second embedding sequence based on n-grams of the second clause;

generating, with the computer system, a first data model object and a second data model object based on the first embedding sequence and the second embedding sequence, wherein:
　the first data model object comprises a first field populated with a first n-gram of the first clause and a second field populated with a first category; and
　the second data model object comprises third field populated with a second n-gram of the second clause and a fourth field populated with a second category;

determining, with the computer system, an association between the first data model object and the second data model object based on a shared parameter of the first and second clauses;

receiving, with the computer system, a query comprising the first category and the first n-gram;

causing, with the computer system, a presentation of a visualization of the first and second data model objects in response to receiving the query, the visualization comprising:
　a first shape comprising the first n-gram and the first category;
　a second shape comprising the second n-gram and the second category; and
　a third shape comprising a first end that is connected to the first shape and a second end that is connected to the second shape based on the association between the first data model object and the second data model object; and storing, with the computer system, the first data model object and the second data model object in memory.

2. The medium of claim 1, wherein:
the first embedding sequence is a first ordered list of embedding vectors each corresponding to one of the n-grams in the first clause;
the second embedding sequence is a second ordered list of embedding vectors each corresponding to one of the n-grams in the second clause;
the first data model object is a first semantic triple; and
the second data model object is a second semantic triple.

3. The medium of claim 1, wherein generating the first and second data model objects comprises:
determining a first candidate subject entity based on the first embedding sequence and a second candidate subject entity based on the second embedding sequence;
determining whether the first candidate subject entity and the second candidate subject entity are entities identified by a stored set of entity identifiers;
in response to a determination that the first and second candidate subject entities are entities identified by the stored set of entity identifiers, populating the first field with the first candidate subject entity and the second field with the second candidate subject entity;
selecting the first category based on the first candidate subject entity and the second category based on the second candidate subject entity using a machine learning model;
populating the second field with the first category and the fourth field with the second category.

4. The medium of claim 1, the operations further comprising:
   determining boundaries of a first text section based on a header of the first text section, wherein the header is bounded by at least one of a formatting tag, a newline, or a colon; and
   storing a stored set of entity identifiers based on n-grams of the first text section;
   determining whether a sequence of strings comprises an identifier of the stored set of entity identifiers; and
   in response to a determination that the sequence of strings comprises the identifier, determining that the sequence of strings is a lexical item of a set of lexical items, wherein generating the first embedding sequence comprises generating an embedding vector based on the lexical item.

5. The medium of claim 1, the operations further comprising:
   determining a domain category of the natural-language-text document; and
   selecting a machine learning model parameter of a plurality of machine learning model parameters based on the domain category, wherein using a machine learning model comprises using the machine learning model parameter.

6. The medium of claim 1, wherein generating the first data model object comprises:
   training a machine learning model to obtain a first set of machine learning model parameters based on an objective function result, wherein the objective function result is determined based on a summation of linkage scores between different embedding vectors, and wherein the linkage scores are determined based on a predicted probability of the machine learning model and a training probability of a training set;
   determining a set of probabilities indicating pairwise likelihoods of the first embedding sequence using the machine learning model based on the first set of machine learning model parameters;
   determining a first predicate value of the first clause based on the set of probabilities;
   validating the first predicate value based on a stored set of predicate values;
   selecting a sequence position based on an initiating position or terminal position of the first predicate value of the first clause; and
   selecting a first continuous subsection of the first embedding sequence based on the sequence position, wherein the first continuous subsection comprises an embedding vector representing the first n-gram, wherein generating the first data model object comprises determining a value of the first field based on the first continuous subsection.

7. The medium of claim 6, the operations further comprising:
   determining a second continuous subsection of the first embedding sequence based on the sequence position, wherein the second continuous subsection does not comprise an embedding vector representing the first n-gram; and
   populating a fifth field based on an embedding vector of the second continuous subsection using a machine learning model, wherein the fifth field is a field of the first data model object.

8. The medium of claim 6, the operations further comprising:
   retrieving a second set of machine learning model parameters;
   determining a second continuous subsection of the first embedding sequence based on the sequence position, wherein the second continuous subsection does not comprise a first embedding vector representing the first n-gram;
   determining a second embedding vector based on the second set of machine learning model parameters and the predicate value; and
   populating a third field of the first data model object based on the second embedding vector.

9. The medium of claim 1, wherein the first data model object is associated with a third data model object, the operations further comprising:
   determining whether the first clause comprises a word associated with a set of words representing a negation term; and
   assigning a tag associated with an association between the first data model object and the second data model object based on a determination that the clause comprises the word associated with the set of words.

10. The medium of claim 1, wherein storing the first and second data model objects in memory comprises storing a data structure comprising the first and second data model objects in a distributed, tamper-evident data store of a peer-to-peer data-sharing network.

11. The medium of claim 1, wherein the first shape comprises:
    a first indication of the first category with respect to a first entity; and
    a second indication of the second category with respect to a second entity.

12. The medium of claim 1, wherein storing the first data model object and the second data model object in memory comprises storing a graph structure, the operations further comprising:
    updating the graph structure to comprise a first graph vertex of the graph structure based on the first clause, wherein the first graph vertex is associated with the first data model object;
    updating the graph structure to comprise a second graph vertex of the graph structure based on the second clause, wherein the second graph vertex is associated with the second data model object; and
    updating the graph structure to comprise a graph edge comprising an identifier of the first graph vertex and an identifier of the second graph vertex based on the association between the first data model object and the second data model object.

13. The medium of claim 12, the operations further comprising:
    indexing the first graph vertex based on the first category;
    wherein causing the presentation of the visualization comprises:
        retrieving the identifier of the first graph vertex based on the first category received via the query;
        retrieving the identifier of the second graph vertex based on the graph edge; and
        displaying text stored in association with the first graph vertex and the second graph vertex.

14. The medium of claim 1, wherein determining the association between the first data model object and the second data model object comprises:

determining a set of text sections by segmenting the natural-language-text document based on formatting tags or whitespaces of the natural-language-text document;

determining the shared parameter of the first and second clauses comprises by:

determining a first parameter of the first clause based on a value of the first data model object;

determining whether a field of the second data model object comprises the first parameter; and based on a determination that the second data model object comprises the field, determining that the shared parameter comprises the first parameter.

15. The medium of claim 1, the operations further comprising:

determining a first set of linkage scores between embedding vectors of the first embedding sequence by, for each respective pair of embedding vectors of the first embedding sequence, determining a respective linkage score;

determining a set of summation values of logs of the first set of linkage scores, wherein each summation value of the set of summation values is associated with one or more embedding vectors of the first embedding sequence; and determining the first n-gram based on a maximum of the set of summation values.

16. The medium of claim 1, wherein determining the first embedding sequence comprises:

generating a token sequence based on the first clause, wherein each respective token of the token sequence comprises a part of the first clause; and generating the first embedding sequence based on the token sequence, wherein each respective embedding vector is associated with a respective token of the token sequence.

17. The medium of claim 1, the operations further comprising:

determining a first intermediate output of a machine learning model based on a noninitial, non-terminal embedding vector of the first embedding sequence, a second intermediate output, and a third intermediate output, wherein:

the second intermediate output is determined based on a first embedding vector that is positioned before the noninitial, non-terminal embedding vector; and the third intermediate output is determined based on a second embedding vector that is positioned after the noninitial, non-terminal embedding vector in the first embedding sequence; and determining the first category associating the noninitial, non-terminal embedding vector with the first category based on the first intermediate output.

18. The medium of claim 1, the operations further comprising:

determining a first sequence of parts-of-speech values corresponding with the first embedding sequence based on the first clause by, for each respective lexical item of the first clause, assigning a respective parts-of-speech value;

providing, during a first timestep, the first embedding sequence and the first sequence of parts-of-speech values to a machine learning model to determine a first intermediate output;

providing, during a second timestep, the first intermediate output, the first embedding sequence, and the first sequence of parts-of-speech values to the machine learning model to determine the first category.

19. The medium of claim 1, wherein determining the first data model object comprises steps for determining the first data model object.

20. The medium of claim 1, wherein determining the first embedding sequence comprises steps for determining the first embedding sequence.

21. A method comprising:

obtaining, with a computer system, a natural-language-text document comprising a first clause and a second clause;

determining, with the computer system, a first embedding sequence based on n-grams of the first clause and a second embedding sequence based on n-grams of the second clause;

generating, with the computer system, a first data model object and a second data model object based on the first embedding sequence and the second embedding sequence, wherein:

the first data model object comprises a first field populated with a first n-gram of the first clause and a second field populated with a first category; and the second data model object comprises third field populated with a second n-gram of the second clause and a fourth field populated with a second category;

determining, with the computer system, an association between the first data model object and the second data model object based on a shared parameter of the first and second clauses;

receiving, with the computer system, a query comprising the first category and the first n-gram;

causing, with the computer system, a presentation of a visualization of the first and second data model objects in response to receiving the query, the visualization comprising:

a first shape comprising the first n-gram and the first category a second shape comprising the second n-gram and the second category; and a third shape comprising a first end that is connected to the first shape and a second end that is connected to the second shape based on the association between the first data model object and the second data model object; and storing, with the computer system, the first data model object and the second data model object in memory.

22. The method of claim 21, further comprising:

determining a first candidate subject entity based on the first embedding sequence and a second candidate subject entity based on the second embedding sequence;

determining whether the first candidate subject entity and the second candidate subject entity are entities identified by a stored set of entity identifiers;

in response to a determination that the first and second candidate subject entities are entities identified by the stored set of entity identifiers, populating the first field with the first candidate subject entity and the second field with the second candidate subject entity;

selecting the first category based on the first candidate subject entity and the second category based on the second candidate subject entity using a machine learning model;

populating the second field with the first category and the fourth field with the second category.

23. The method of claim 21, further comprising:
determining boundaries of a first text section based on a header of the first text section, wherein the header is bounded by at least one of a formatting tag, a newline, or a colon; and
storing a stored set of entity identifiers based on n-grams of the first text section;
determining whether a sequence of strings comprises an identifier of the stored set of entity identifiers; and
in response to a determination that the sequence of strings comprises the identifier, determining that the sequence of strings is a lexical item of a set of lexical items, wherein generating the first embedding sequence comprises generating an embedding vector based on the lexical item.

24. The method of claim 21, further comprising:
determining a domain category of the natural-language-text document; and
selecting a machine learning model parameter of a plurality of machine learning model parameters based on the domain category, wherein using a machine learning model comprises using the machine learning model parameter.

25. The method of claim 21, further comprising:
training a machine learning model to obtain a first set of machine learning model parameters based on an objective function result, wherein the objective function result is determined based on a summation of linkage scores between different embedding vectors, and wherein the linkage scores are determined based on a predicted probability of the machine learning model and a training probability of a training set;
determining a set of probabilities indicating pairwise likelihoods of the first embedding sequence using the machine learning model based on the first set of machine learning model parameters;
determining a first predicate value of the first clause based on the set of probabilities;
validating the first predicate value based on a stored set of predicate values;
selecting a sequence position based on an initiating position or terminal position of the first predicate value of the first clause; and
selecting a first continuous subsection of the first embedding sequence based on the sequence position, wherein the first continuous subsection comprises an embedding vector representing the first n-gram, wherein generating the first data model object comprises determining a value of the first field based on the first continuous subsection.

26. The method of claim 25, further comprising:
determining a second continuous subsection of the first embedding sequence based on the sequence position, wherein the second continuous subsection does not comprise an embedding vector representing the first n-gram; and
populating a fifth field based on an embedding vector of the second continuous subsection using a machine learning model, wherein the fifth field is a field of the first data model object.

27. The method of claim 25, further comprising:
retrieving a second set of machine learning model parameters;
determining a second continuous subsection of the first embedding sequence based on the sequence position, wherein the second continuous subsection does not comprise a first embedding vector representing the first n-gram;
determining a second embedding vector based on the second set of machine learning model parameters and the predicate value; and
populating a third field of the first data model object based on the second embedding vector.

28. The method of claim 21, further comprising:
determining whether the first clause comprises a word associated with a set of words representing a negation term; and
assigning a tag associated with an association between the first data model object and the second data model object based on a determination that the clause comprises the word associated with the set of words.

29. The method of claim 21, wherein storing the first and second data model objects in memory comprises storing a data structure comprising the first and second data model objects in a distributed, tamper-evident data store of a peer-to-peer data-sharing network.

30. The method of claim 21, wherein storing the first data model object and the second data model object in memory comprises storing a graph structure, the method further comprising:
updating the graph structure to comprise a first graph vertex of the graph structure based on the first clause, wherein the first graph vertex is associated with the first data model object;
updating the graph structure to comprise a second graph vertex of the graph structure based on the second clause, wherein the second graph vertex is associated with the second data model object; and
updating the graph structure to comprise a graph edge comprising an identifier of the first graph vertex and an identifier of the second graph vertex based on the association between the first data model object and the second data model object.

31. The method of claim 30, further comprising:
indexing the first graph vertex based on the first category;
wherein causing the presentation of the visualization comprises:
retrieving the identifier of the first graph vertex based on the first category received via the query;
retrieving the identifier of the second graph vertex based on the graph edge; and
displaying text stored in association with the first graph vertex and the second graph vertex.

32. The method of claim 21, wherein determining the association between the first data model object and the second data model object comprises:
determining a set of text sections by segmenting the natural-language-text document based on formatting tags or whitespaces of the natural-language-text document;
determining the shared parameter of the first and second clauses comprises by:
determining a first parameter of the first clause based on a value of the first data model object;
determining whether a field of the second data model object comprises the first parameter; and
based on a determination that the second data model object comprises the field, determining that the shared parameter comprises the first parameter.

33. The method of claim 21, further comprising:
determining a first set of linkage scores between embedding vectors of the first embedding sequence by, for each respective pair of embedding vectors of the first embedding sequence, determining a respective linkage score;

determining a set of summation values of logs of the first set of linkage scores, wherein each summation value of the set of summation values is associated with one or more embedding vectors of the first embedding sequence; and determining the first n-gram based on a maximum of the set of summation values.

34. The method of claim 21, wherein determining the first embedding sequence comprises:

generating a token sequence based on the first clause, wherein each respective token of the token sequence comprises a part of the first clause; and generating the first embedding sequence based on the token sequence, wherein each respective embedding vector is associated with a respective token of the token sequence.

35. The method of claim 21, further comprising:

determining a first intermediate output of a machine learning model based on a noninitial, non-terminal embedding vector of the first embedding sequence, a second intermediate output, and a third intermediate output, wherein:

the second intermediate output is determined based on a first embedding vector that is positioned before the noninitial, non-terminal embedding vector; and the third intermediate output is determined based on a second embedding vector that is positioned after the noninitial, non-terminal embedding vector in the first embedding sequence; and determining the first category associating the noninitial, non-terminal embedding vector with the first category based on the first intermediate output.

36. The method of claim 21, further comprising:

determining a first sequence of parts-of-speech values corresponding with the first embedding sequence based on the first clause by, for each respective lexical item of the first clause, assigning a respective parts-of-speech value;

providing, during a first timestep, the first embedding sequence and the first sequence of parts-of-speech values to a machine learning model to determine a first intermediate output;

providing, during a second timestep, the first intermediate output, the first embedding sequence, and the first sequence of parts-of-speech values to the machine learning model to determine the first category.

37. The method of claim 21, wherein determining the first data model object comprises steps for determining the first data model object.

38. The method of claim 21, wherein determining the first embedding sequence comprises steps for determining the first embedding sequence.

* * * * *